(12) United States Patent
Jacobson et al.

(10) Patent No.: US 7,475,227 B2
(45) Date of Patent: Jan. 6, 2009

(54) METHOD OF STALLING ONE OR MORE STAGES IN AN INTERLOCKED SYNCHRONOUS PIPELINE

(75) Inventors: Hans M. Jacobson, White Plains, NY (US); Prabhakar N. Kudva, New York, NY (US); Pradip Bose, Yorktown Heights, NY (US); Peter W. Cook, Mount Kisco, NY (US); Stanley E. Schuster, Granite Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/375,989

(22) Filed: Mar. 14, 2006

(65) Prior Publication Data

US 2006/0161795 A1  Jul. 20, 2006

Related U.S. Application Data

(62) Division of application No. 10/262,769, filed on Oct. 2, 2002, now Pat. No. 7,065,665.

(51) Int. Cl.
G06F 9/30 (2006.01)
H04L 5/00 (2006.01)

(52) U.S. Cl. .................... 712/219; 712/245; 713/400

(58) Field of Classification Search .............. 712/219
See application file for complete search history.

(56) References Cited

U.S. PATENT DOCUMENTS

| | | | | |
|---|---|---|---|---|
| 5,025,408 A * | 6/1991 | Sherman | ................ | 708/627 |
| 5,325,495 A * | 6/1994 | McLellan | ................ | 712/219 |
| 5,555,384 A * | 9/1996 | Roberts et al. | ............ | 712/216 |
| 5,717,946 A * | 2/1998 | Satou et al. | ............... | 712/225 |
| 5,768,575 A * | 6/1998 | McFarland et al. | ........ | 712/228 |
| 5,784,636 A | 7/1998 | Rupp | | |
| 5,918,042 A | 6/1999 | Furber | | |
| 6,192,466 B1 * | 2/2001 | Gschwind | ................ | 712/214 |
| 6,247,134 B1 * | 6/2001 | Sproch et al. | ............ | 713/320 |
| 6,279,100 B1 * | 8/2001 | Tremblay et al. | .......... | 712/24 |

(Continued)

OTHER PUBLICATIONS

Gowan, Brio, and Jackson, Power Considerations in the Design of the Alpha 21264 Microprocessor, Jun. 1998, pp. 726-731, Publisher: Proc. ACM/IEEE Design Automation Conference.

(Continued)

Primary Examiner—Eddie P Chan
Assistant Examiner—William B Partridge
(74) Attorney, Agent, or Firm—Law Office of Charles W. Peterson, Jr.; Louis J. Percello, Esq.; Brian P. Verminski, Esq.

(57) ABSTRACT

A method of operating an integrated circuit including a pipeline and a method of stalling stages in the pipeline. Each stage of the pipeline is triggered by one or more triggering events and are individually, and selectively, stalled by a stall signal. For each stage a stall signal, delayed with respect to the stall signal of a downstream stage, is generated and used to select whether the pipeline stage in question is triggered. A data valid signal propagating with valid data adds further selection, such that only stages with valid data are stalled.

18 Claims, 25 Drawing Sheets

U.S. PATENT DOCUMENTS

| | | | |
|---|---|---|---|
| 6,393,579 B1 * | 5/2002 | Piazza | 713/600 |
| 6,581,150 B1 * | 6/2003 | Col et al. | 711/201 |
| 6,629,234 B1 * | 9/2003 | Col | 712/219 |
| 6,724,361 B1 | 4/2004 | Washio et al. | |
| 6,823,448 B2 * | 11/2004 | Roth et al. | 712/244 |
| 6,851,033 B2 | 2/2005 | Grisenthwaite | |
| 6,910,122 B1 * | 6/2005 | Bass et al. | 712/219 |
| 6,946,869 B2 | 9/2005 | Jacobson et al. | |
| 2002/0004859 A1 * | 1/2002 | Stoney | 710/7 |
| 2002/0083298 A1 * | 6/2002 | Cook et al. | 712/25 |

OTHER PUBLICATIONS

O'Leary and Brown, Synchronous Emulation of Asynchronous Circuits, Feb. 1997, pp. 205-209, Publisher: IEEE Transactions on Computer-Aided Design of Integrated Circuits And Systems.

Patterson and Hennessy, Computer Architecture: A Quantitative Approach, 1990, vol. 2nd edition, Publisher: Morgan Kaufmann Publishers, Inc.

Mercer, Myers, and Yoneda, Improved POSET Timing Analysis in Timed Petrl Nete, Oct. 2001, Publisher: SASIMI.

* cited by examiner

| gclk | inp. env. | L1 | L2 | L3 | L4 | |
|------|------|------|------|------|------|------|
| 168h | 1 | C 0 | B 0 | B 0 | A 0 | A 0 | (data) (stall) |
| 168l | 0 | C 0 | C 0 | B 0 | B 0 | A 1 |
| 170h | 1 | D 0 | C 0 | C 0 | B 1 | A 1 |
| 170l | 0 | D 0 | D 0 | C 0 | B 1 | A 1 |
| 172h | 1 | E 0 | D 1 | C 1 | B 1 | A 1 |
| 172l | 0 | E 1 | D 1 | C 1 | B 1 | A 0 |
| 174h | 1 | E 1 | D 1 | C 1 | B 0 | B 0 |
| 174l | 0 | E 1 | D 1 | C 0 | C 0 | B 0 |
| 176h | 1 | E 1 | D 0 | D 0 | C 0 | C 0 |
| 176l | 0 | E 0 | E 0 | D 0 | D 0 | C 0 |

← data    stall →

166 time ↓

FIG.4C

METHOD OF STALLING ONE OR MORE STAGES IN AN INTERLOCKED SYNCHRONOUS PIPELINE

The present application is a divisional application of allowed U.S. patent application Ser. No. 10/262,769, entitled "INTERLOCKED SYNCHRONOUS PIPELINE CLOCK GATING" to Hans JACOBSON et al., filed Oct. 2, 2002, now issued as U.S. Pat. No. 7,065,665 B2; and to related U.S. patent application Ser. No. 11/376,544, entitled "INTERLOCKED SYNCHRONOUS PIPELINE CLOCK GATING" to Hans JACOBSON et al., filed coincident herewith, both of which are assigned to the assignee of the present invention and incorporated herein by reference.

BACKGROUND OF THE INVENTION

1. Field of the Invention
2. Description of the Related Art

Semiconductor technology and chip manufacturing advances have resulted in a steady increase of on-chip clock frequencies, the number of transistors on a single chip and the die size itself accompanied by a corresponding decrease in chip supply voltage. Generally, the power consumed by a given clocked unit (e.g., latch, register, register file, functional unit and etc.) increases linearly with the frequency of switching within the unit. Thus, not withstanding the decrease of chip supply voltage, chip power consumption has increased as well. In current microprocessor designs, over 70% of the power consumed is attributable to the clock alone. Typically, over 90% of this power is consumed in local clock splitters/drivers and latches.

Both at the chip and system levels cooling and packaging costs have escalated as a natural result of this increase in chip power. It is crucial for low end systems (e.g., handhelds, portable and mobile systems) to reduce net energy consumption to extend battery life but, without degrading performance to unacceptable levels. Thus, the increase in microprocessor power dissipation has become a major stumbling block for future performance gains.

Accordingly, clock gating techniques that selectively stop functional unit clocks have become the primary approach to reducing clock power. Typically, clock gating is applied in an ad hoc fashion, which makes verification and clock skew management difficult. This is not expected to abate with ever larger and more complex designs unless a clearly defined and structured clock gating approach is developed.

A typical state of the art synchronous pipeline includes multiple stages, at least some of which may be separated by logic, each stage including an N latch register, at least one latch for each data bit propagating down the pipeline and, all of the stages synchronously clocked by a single global clock. A simple example of a pipeline is a first-in first-out (FIFO) register. A FIFO is an M stage by N bit register file, typically used as an M-clock cycle delay. Each cycle the FIFO receives an N-bit word from input logic and it passes an M-cycle old, N-bit word to output logic. On each clock cycle (i.e., every other leading or falling clock edge) each N-bit word in the FIFO advances one stage. Typical examples of much more complex synchronous pipelines include state of the art microprocessors or functional units (e.g., an I-unit or an E-unit) within a state of the art microprocessor.

Traditionally, synchronous pipelines have been stalled globally, where all stages of either the entire pipeline, or a multistage unit, are stalled at the same time. However, cycle time and switching current constraints limit the number of stages that can be stalled during the same cycle. A difficulty with progressively stalling synchronous pipelines is that data is lost at stall boundaries. Further, as wire delays increase and become a concern, propagating a stall signal throughout a unit or between units, for example, may cause excessive signal delay, both from long wires and signal buffering requirements. Heretofore, achieving local clock gating based on stall conditions has not been possible because stalled data may be overwritten by data progressing through the pipeline from an earlier stage.

FIG. 1A shows an example of a four portion of a synchronous pipeline 10 (e.g., in the middle of a FIFO or in a microprocessor) at stages 12, 14, 16, 18 holding data items D, C, B, A, respectively. A stall boundary 20 indicates a point in the pipeline 10 where, because of placement and cycle time constraints, the next clock edge arrives at upstream stages before stall signal 22, thus providing insufficient time to disable the clock at those upstream stages. While the stall signal 22 reaches downstream stage 16 and subsequent stages (not shown) with sufficient disable time and correctly halt; because stages 12, 14 and stages upstream of the boundary 20 do not receive the stall signal in time, they therefore latch new data on the clock edge incorrectly, potentially losing data that should be held there. So, in this example stages 16 and 18 are stalled, trapping data items B and A, respectively. Stages 12, 14 however, do not see the stall signal in time and therefore, latch data items E and D in the next clock cycle. Consequently, data item C is overwritten and lost, instead of being trapped in stalled stage 14.

FIG. 1B shows a traditional approach to handling progressive stalls wherein buffer stages 23 (often referred to as staging latches) are inserted in parallel to the pipeline at selected stall boundaries, e.g., 20. During a stall the staging latches 23 temporarily store data that would otherwise be overwritten. Unfortunately, because staging latches 23 add area, power, and delay overhead, stalls have traditionally been performed at a coarse level, i.e., staging latches are only at predicted stall boundaries. However, as noted above for globally propagated stall signals, increased wire delays, increased load on the stall signal from increasing the number of latches to achieve deeper pipelines (more stages) and demand for shorter cycle time combine to restrict how far the stall signal can propagate before it impacts cycle time. So, providing staging latches at a finer granularity, e.g., for stalling stage by stage, introduces extra buffer stages to double the number of latches in a pipeline. Clearly, the added staging latch area and power as well as increased chip complexity renders this solution impractical at other than a very coarse granularity.

Thus, there exists a need for fine grained pipeline stage level clock gating for synchronous pipelines and where the decision to or not to gate the clock can be made local to each stage rather than at the global level, while avoiding costly extra buffers.

SUMMARY OF THE INVENTION

It is a purpose of the invention to minimize clock power in synchronous designs;

It is another purpose of the invention to increase clock gating flexibility;

It is yet another purpose of the invention to improve pipeline clock control signal slack;

It is yet another purpose of the invention to reduce synchronous logic design effort with a natural, clearly defined and structured approach to clock gating;

It is yet another purpose of the invention to progressively stall high frequency pipelines without using staging latches or data hold muxes;

It is yet another purpose of the invention to increase effective pipeline storage capacity;

It is yet another purpose of the invention to increase storage capacity in queue structures.

The present invention relates to a method of operating an integrated circuit including a pipeline and a method of stalling stages in the pipeline. Each stage of the pipeline is triggered by a trigger event and individually, selectively stalled by a stall signal. For each stage a stall signal, delayed with respect to the stall signal of a downstream stage, is generated and used to select whether the pipeline stage in question is triggered. A data valid signal propagating with valid data adds further selection, such that only stages with valid data are stalled.

BRIEF DESCRIPTION OF THE DRAWINGS

The foregoing and other objects, aspects and advantages will be better understood from the following detailed description of illustrative embodiments of the invention with reference to the drawings, in which:

FIG. 4C shows a sub-trace of the timing diagram example of FIG. 4B;

TERM DEFINITIONS

Figure 1A:
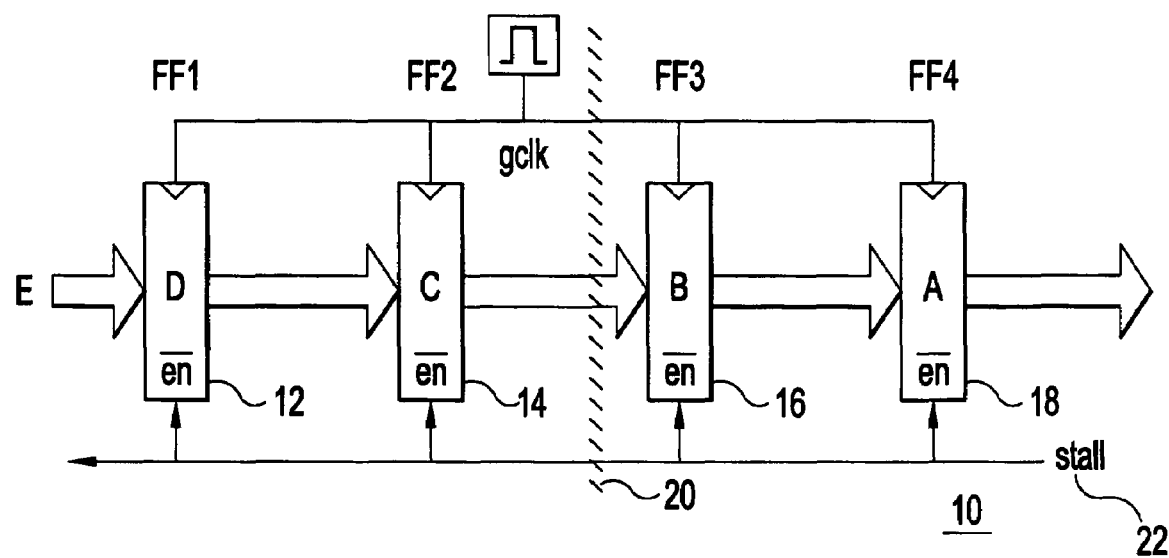
FIG. 1A shows a synchronous pipeline with a stall between two stages.

PIPELINE CLOCKING: Synchronously clocked pipelines are well known in the art. Locally clocked pipelines are also well known in the art and may, for example, be implemented as synchronous islands which interface either through handshake techniques as in Globally Asynchronous Locally Synchronous (GALS) approaches or through Phase Locked Loop (PLL) based synchronization techniques.

DATA: We define data as any information that is present in an integrated circuit. This includes, but is not limited to, data signals in a data-path and control signals in a control-path.

PIPELINE STAGE: We define a basic stage in a pipeline to contain a single layer of data storage nodes (where a layer is a collection of parallel storage nodes). In the present description a mentioned stage refers to this definition unless otherwise indicated either explicitly or by the context.

SPLIT LATCH PIPELINE: Since stages with two sequential layers of storage nodes are more frequently used in the art, pipelines that are made up of stages with only one layer of storage nodes are often referred to as using split latches.

DATA STORAGE NODE: A data storage node in a stage of a split latch pipeline can, for example, be one of the following: a transparent latch, a precharged domino logic, a precharged cross-coupled inverter latch, or a Set-Reset latch. Such latches and other variations are well known in the art.

PIPELINE DOUBLE-STAGE: In many modern VLSI designs, the storage nodes in two adjacent split latch stages are merged and together are considered to be a stage. This is frequently done in pipelines based on, for example, the following latch types: a master/slave latch or D-flip/flop, or a sense-amplifier latch. Such latches and other variations containing two sequential data storage nodes are well known in the art.

DATA STORING: The act of storing data in mentioned storage nodes is performed in response to a triggering event. A node that stores data also inhibits new input data from passing through the node.

TRIGGER EVENT: The mentioned triggering event can, for example, be one of the following: a rising or falling edge on a global or local clock or signal, a pulse on a clock or other signal, an edge or a pulse on an asynchronous sequencing signal, or an edge or a pulse on a timing signal. Clocks, pulses, asynchronous sequencing signals, and other types of timing signals are well known in the art.

ALTERNATE EVENTS: Although not necessarily always so (e.g., for pulsed master-slave pipelines (elaborated later)), adjacent stages in split-latch pipelines typically store data on alternate triggering events. For example, a stage may store data on a falling edge of a global clock while its adjacent downstream stage stores data on the rising edge of the global clock. This is done to avoid data racing through two or more adjacent stages thus making sure that data in the pipeline progress in an orderly stage by stage lock step fashion. Stages containing two storage nodes often use a similar approach of storing data in adjacent storage nodes on alternate triggering events.

STALE DATA: A data is said to be stale if it will not be used in subsequent computations. An example of stale data is data that is duplicatively stored in adjacent stages. Once the downstream stage stores the passed data, the same data held in the current stage becomes stale. This situation does not occur, for example, in two phase clocked pipelines where the edges on the two clocks overlap as the data in the current stage is overwritten at the same time as the data is stored in the downstream stage. However, in two phase clocked pipelines with, for example, non-overlapping clock pulses, it is possible for both the current and downstream stages to momentarily store the same data. In such cases, the data in the current stage is considered stale.

LOGIC CIRCUIT: Logic circuits may reside between each of mentioned stages. Such logic circuits may, for example, compute a datapath function, a control function, or a function that gates one or more global or local triggering events. Such logic functions can also be used to produce valid and stall signals that are used to inhibit, or gate, triggering events.

STAGE COMPONENTS: A stage is an abstraction which may contain components in addition to the mentioned layer (s) of data storage nodes. Mentioned layer of storage nodes in a stage is also referred to as a register stage. A stage may contain a trigger event generator that, responsive to a stage triggering event, selectively produces local trigger events to the different components of a stage. A clock-splitter (or clock-block) is an example of such a trigger event generator that is well known in the art. Based on a set of inputs, such as signals indicating if arriving data is valid or not, and signals indicating if the stage needs to stall or not, the trigger event generator may selectively produce mentioned local trigger events. A stage may also contain the logic circuits for the generation and/or propagation of data valid and stall indications.

UPSTREAM/DOWNSTREAM: The terms downstream and upstream are named with respect to the direction data flows through the pipeline. A downstream stage may also be referred to as a subsequent stage. An upstream stage may also be referred to as a previous stage.

ADJACENT: When the term adjacent stages is used, this means that there is a direct communication, or connection, between the stages, without any other stages in between. A downstream adjacent stage can also be referred to as a next subsequent stage, and an upstream adjacent stage may also be referred to as a next previous stage. A stage can of course be adjacent to a plurality of downstream and upstream stages.

DELAYED SIGNALS: The basic operation of a pipeline is to delay data at each stage in the pipeline such that upstream data does not catch up with and overwrite downstream data. When it comes to indicating if data passed to a stage is valid or not, the associated valid indication, for example a valid bit propagating alongside the data, must be delayed along with the data. A downstream valid indication for a given data is therefore delayed with respect to an upstream valid indication for mentioned data. Similarly, in the progressive stalling techniques of the present invention, when it comes to indicating if a given stage should be stalled or not, the associated stall indication, for example a stall bit propagating in the opposite direction of the data, must also be delayed. Otherwise the stalling of stages would not be progressive, but rather coincident. How to coincidentally, or simultaneously, stall multiple stages is well known in the art. However, how to progressively stall a pipeline, other than asynchronous pipelines, one stage at a time as described herein, is novel. The present invention implements progressive stalling by delaying a stall indication of a stage with respect to the stall indication of a downstream stage.

DELAY CONDITIONS: A stall signal can be delayed in two ways. First a stall indication to an upstream stage can be delayed until just before mentioned upstream stage is about to pass, or store, new data due to the arrival of a new triggering event. Second, a stall indication to an upstream stage can be delayed until valid data has been stored in mentioned upstream stage.

DELAY-TIME: The delay time with which a stall signal needs to be delayed is proportional to the time it will take before a next triggering event causes an upstream stage already storing data to pass, or store, new data. For example, in a two phase split latch pipeline where adjacent stages are triggered on alternate clock edges, the delay time for a stall indication is half a clock cycle. In pipelines where data is indicated as valid or not, the delay time is furthermore proportional to the time it will take until valid data arrives and has been stored in mentioned upstream stage. The delay time of a valid signal is proportional to the time it will take before a next triggering event causes a downstream stage to either store or pass new data depending on what type of latch and trigger event scheme is used. In, for example, a synchronous clocked pipeline the delay time needed with respect to a next triggering event is proportional to the global clock period. Depending on the latch and triggering event scheme used, the delay time can be either half a clock cycle or a full clock cycle. Note that the valid indication can be further delayed if the stage is stalled.

STALLING: We define stalling of a stage to mean that a data item is stored, and held, in the stage for current or later use, or potential use, for more time than required to move data through the stage during unobstructed propagation of data through the pipeline. Note that a stage is not considered stalled until the arrival of a stage triggering event, that, if no stall condition was present would have caused the stage to pass, or store, new data. Note that stalling may be more correctly referred to as pausing as the propagation of the stalled data is momentarily paused while the stage is stalled.

INTERLOCK HANDSHAKE: When valid and stall indications are both present in a progressively stalled pipeline, the operation of each stage can be controlled through a valid-stall handshake protocol. The valid and stall indications are used in so called handshakes to signal if valid data is arriving to a stage and if the stage needs to stall. Such a handshake protocol ensures that a stage only passes data when the stage receives valid data and the stage does not need to stall. The handshake protocol also ensures that currently stored valid data is held until a downstream stage is ready to receive the data by indicating that it is not stalled. Using handshake protocols to control propagation of data between stages is a technique to interlock the operation of adjacent stages in the pipeline. In asynchronous pipelines a similar, but also substantially different (as elaborated later), stage interlocking concept is used through what is referred to as a request-acknowledge handshake protocol. Handshake protocols and stage interlocking of asynchronous pipelines is well known in the art. However, handshake protocols and techniques described herein that can provide interlocking between stages in pipelines other than asynchronous pipelines is novel. Storing more than one data item in a storage device containing a plurality of storage nodes, such as a master-slave, flip-flop, or sense-amplifier latch, as described herein is novel also in asynchronous pipelines.

NACKING PROTOCOL: The progressively stalled and interlocked pipelines of the present invention make use of a nacking stall protocol through its use of stall signals. Asynchronous pipelines make use of an acking stall protocol through its use of acknowledge signals. A nacking protocol indicates to a current stage that new data is not accepted by a downstream stage because the downstream stage is stalled. An acking protocol, in contrast, indicates to a stage that the data currently held in that stage has been stored by a downstream stage and new data can now be stored in the current stage. These protocols are substantially different. For example, asynchronous pipelines cannot operate solely on a nacking protocol as there is no signal to provide a time reference for when it is safe to pass a next data item through a stage without risking to overwrite downstream data.

DESCRIPTION OF PREFERRED EMBODIMENTS OF THE INVENTION

Figure 2A:
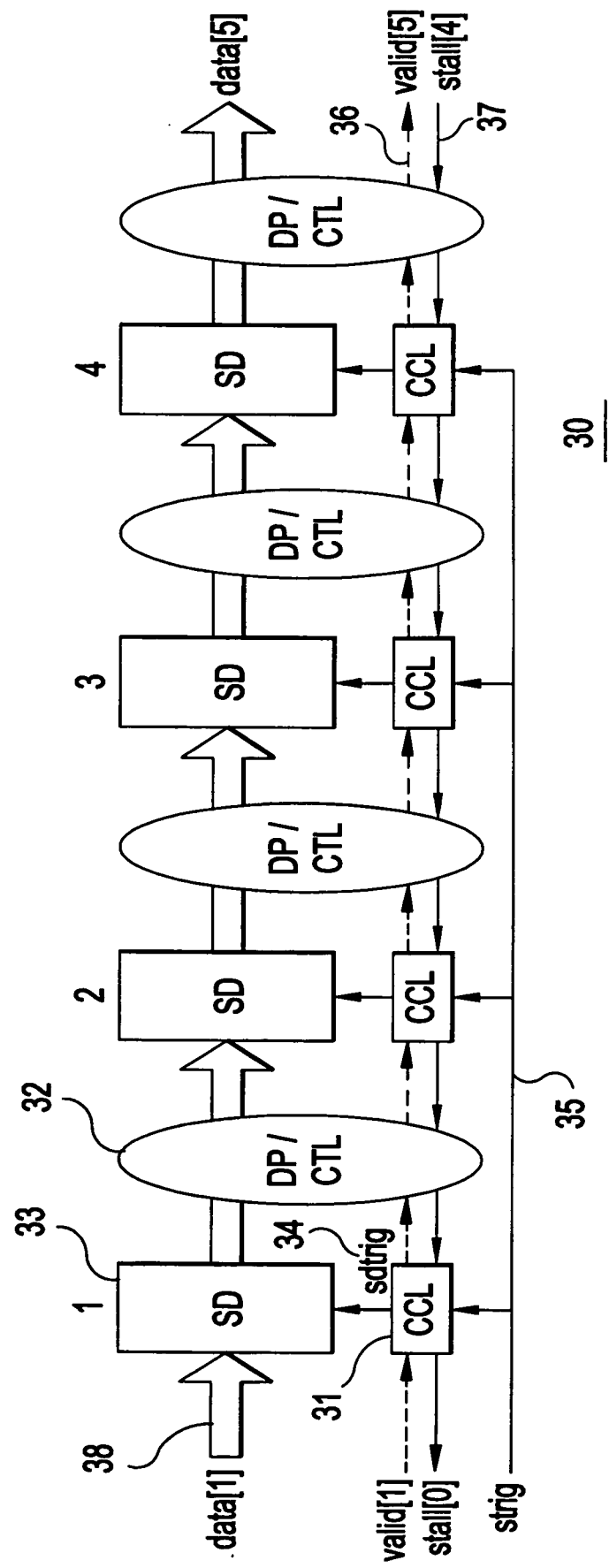
FIG. 2A shows a first preferred embodiment in a progressively stalled interlocked pipeline with distributed handshake and trigger event control logic.
Figure 2B:
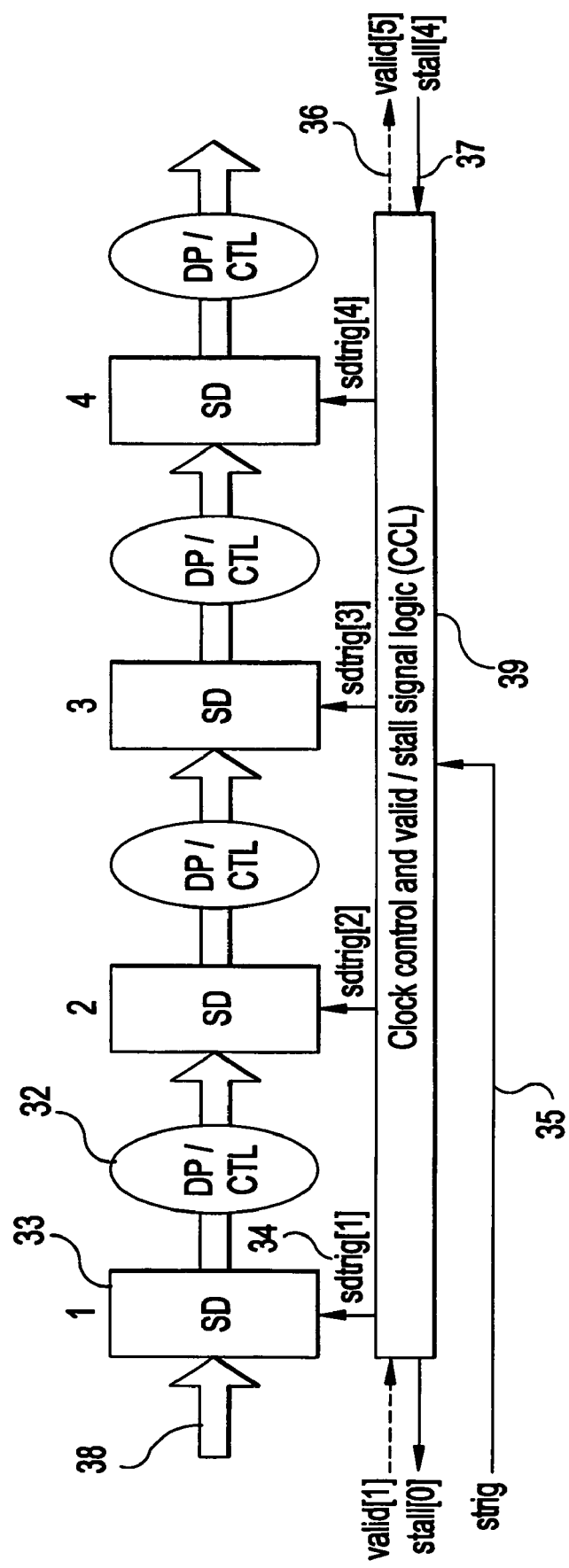
FIG. 2B shows a preferred embodiment in a progressively stalled interlocked pipeline with centralized handshake and trigger event control logic.

A contribution of the present invention is to achieve interlocking between stages in pipelines other than asynchronous pipelines (although the techniques apply also to asynchronous pipelines). FIGS. 2A and 2B illustrate examples of two preferred embodiments. FIG. 2A illustrates an abstract view of an interlocked pipeline 30 where the interlocking handshakes are generated in a distributed fashion by a logic circuit (CCL) 31 and through control/datapath logic (DP/CTL) 32, local to each stage. FIG. 2B illustrates an abstract view of an interlocked pipeline where the interlocking handshakes are generated in a centralized fashion by a common logic circuit 39, such as a state machine. Although not illustrated in FIG. 2B, the common logic circuit 39 may of course be an abstraction of distributed control logic, and may of course receive control and data signals from each pipeline stage and the environment of the pipeline. The register stages (SD) 33 of each stage are triggered by local trigger events generated by the CCL 31/39 (sdtrig 34 in FIGS. 2A and 2B). The CCL is in turn triggered by one or more stage triggering events (strig 35 in FIG. 2A and FIG. 2B). For example, such stage triggering events would, in a synchronous pipeline, be that of a global clock, while in an asynchronous pipeline the triggering events would be the events of a request-acknowledge handshake. The handshakes between stages of the pipeline and between the pipeline and its environment are based on data valid 36 and stall 37 indications, or signals.

The improved storage properties of the present invention is applicable also to asynchronous pipelines. The common logic circuit 39 in FIG. 2B in that case contains a request-acknowledge handshake generation and distribution network that generates the sdtrig 34 events for each pipeline stage, and the valid 36 and stall 37 interface signals may be replaced by request and acknowledge signals if the environment is asynchronous. Although such an asynchronous pipeline already has the ability to progressively stall the pipeline by means of techniques in the art, the present invention can still provide improved storage if stages with two, or more, storage nodes, such as pulsed master-slave latches, flip-flops, or sense-amplifier latches, are used.

Note that the valid signal arrows, e.g. 36, are dashed to indicate that these are optional. In the present invention, a pipeline where no valid signals are present, but stall signals, e.g., 37 are present, implements a progressively stalled pipeline where stages of a pipeline are stalled stage by stage in a "cycle by cycle" fashion. In the present invention, a pipeline where valid and stall signals are both present implements an interlocked pipeline working substantially similar to a progressively stalled pipeline, but, which only passes valid data and only stalls a stage if it contains valid data.

Figure 2C:
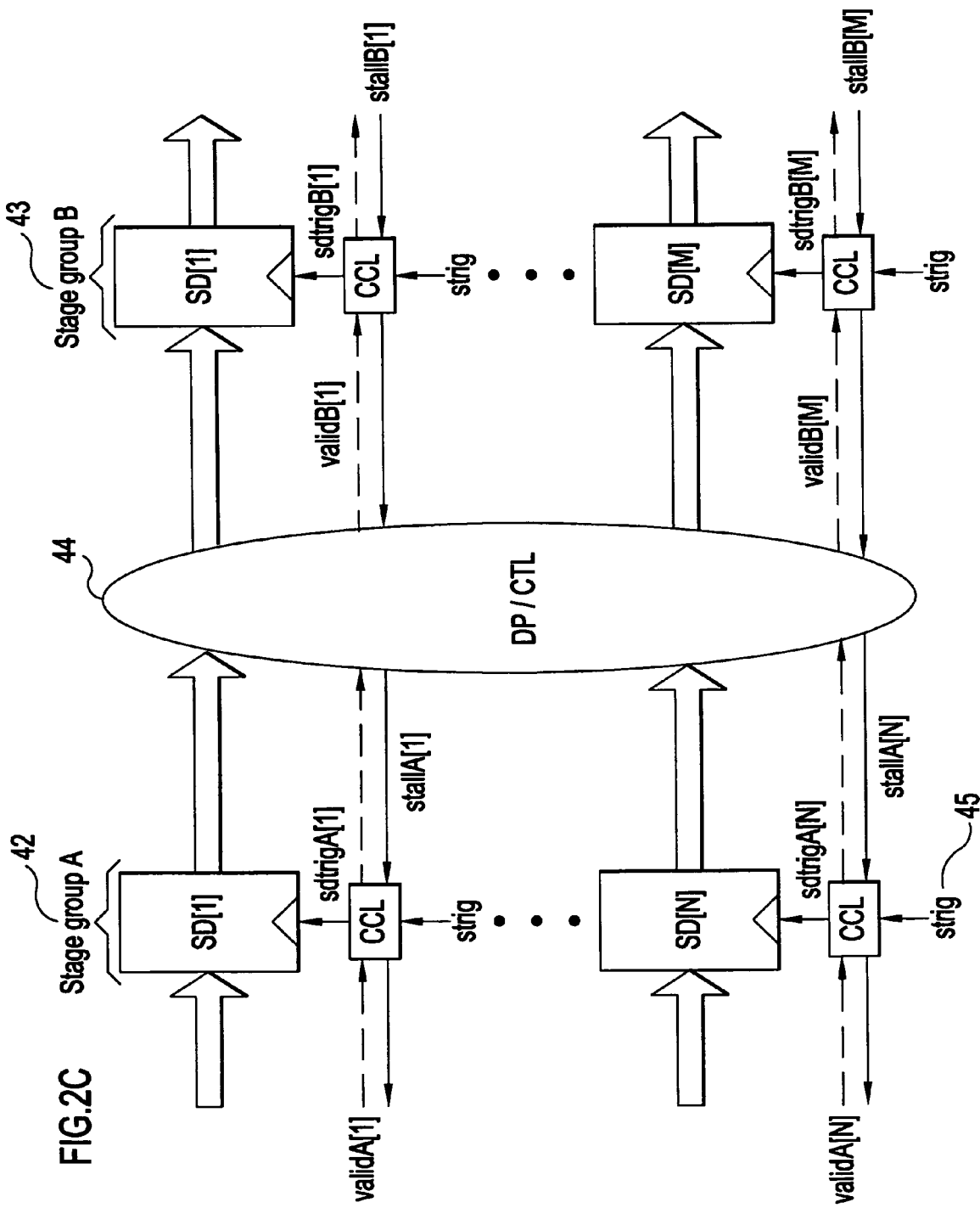
FIG. 2C illustrates cross communication between multiple upstream and downstream stages in a plurality of progressively stalled interlocked pipelines.

As illustrated by FIG. 2C, interlocking between stages can be achieved in general pipeline structures and not just linear pipelines. FIG. 2C illustrates a collection of interlocked pipeline stages 42, 43 that can communicate with each other by exchanging data and valid-stall handshake signals. In the illustrated structure, any input stage 42 can communicate with any output stage 43, and vice versa. The DP/CTL logic 44 can itself be a collection of pipelines. Each stage is triggered by one or more stage trigger events 45. In a synchronous integrated circuit, these stage trigger events would all be generated by the same global clock. In a locally clocked pipeline, some stage triggering events may be generated by different clocks than others. In an asynchronous pipeline the stage triggering events for a stage would be a request-acknowledge handshake for that stage performed on request and acknowledge signals replacing the shown valid and stall signals, rather than performed on the strig 45 signals. Again, note that the valid signals are optional which is illustrated by valid signal arrows being dashed. The progressively stalled and interlocked pipelines of the present invention can be applied to a wide variety of integrated circuits such as, for example, microprocessors and ASICs.

Figure 2D:
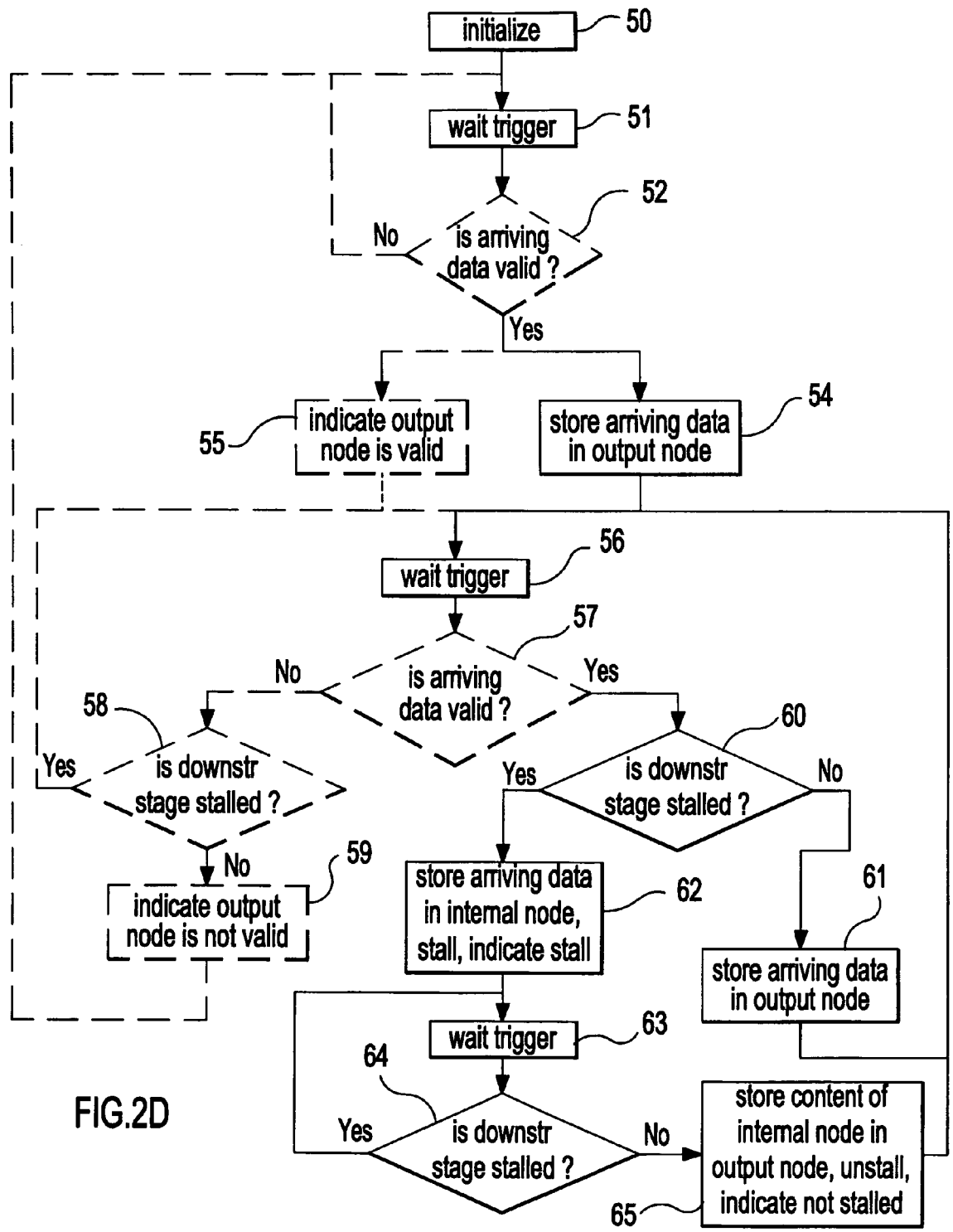
FIG. 2D is a flow diagram that illustrates how propagation of data is handled at the interfaces of an interlocked stage with two storage nodes.
Figure 2E:
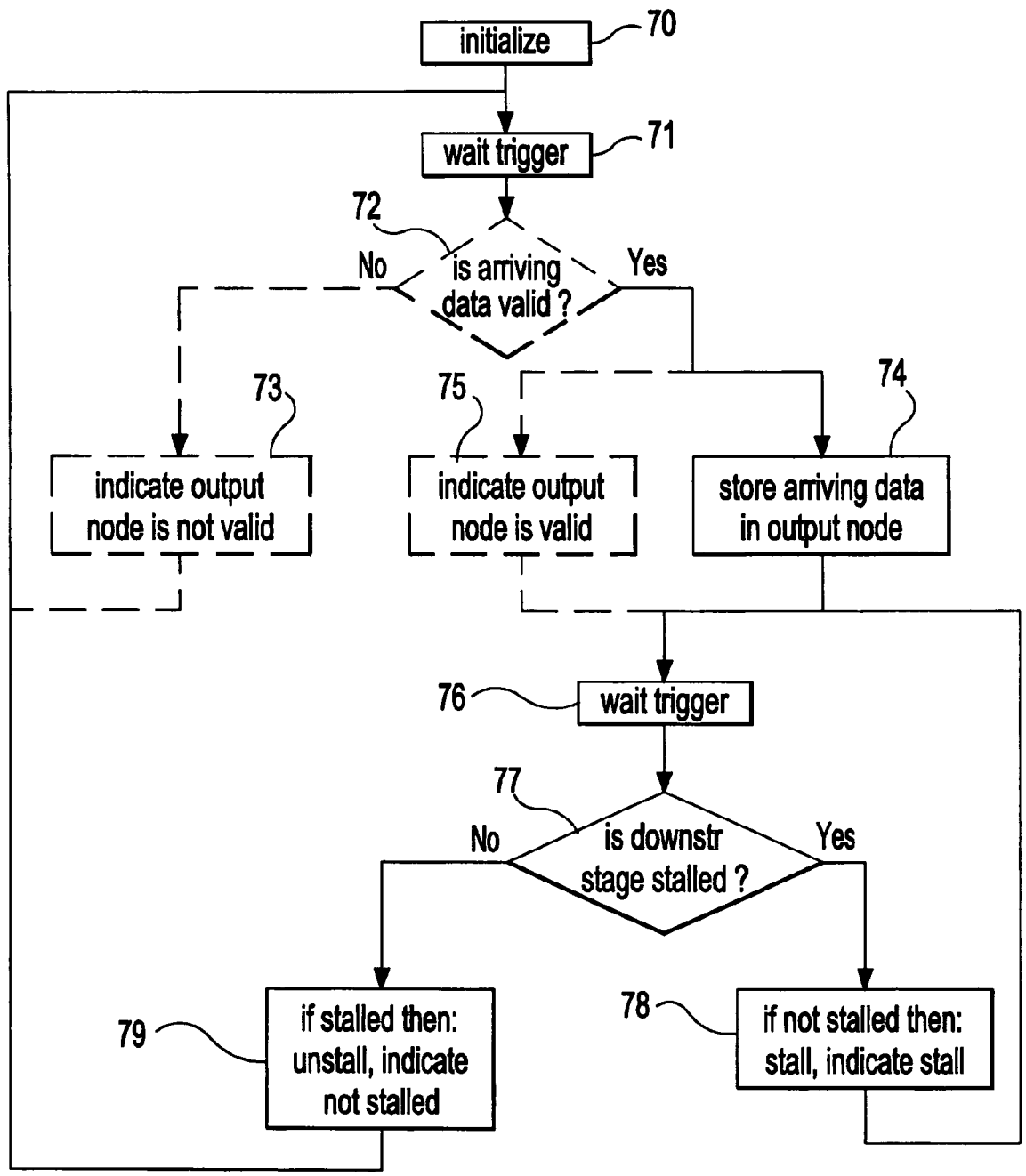
FIG. 2E is a flow diagram that illustrates how propagation of data is handled at the interfaces of an interlocked stage with only one storage node.

The flowcharts in FIGS. 2D and 2E illustrate how stages in a pipeline can be stalled progressively, one stage at a time. The method for progressive stalling observes that in many pipelines where data moves in a lock step, or similar, fashion, only every other storage device actively stores data at any given time. This leaves every other storage device empty. These empty storage devices can thus be used as buffers that can be progressively filled with data during a stall condition. The result is that an indication that a downstream stage is stalled can propagate backwards in the pipeline in a delayed fashion such that, in a linear pipeline, only at most two storage devices need to stall per computation cycle. In a two phase linear pipeline where alternate storage devices store data at alternate times only at most one storage device needs to stall per half-cycle.

The flowcharts of FIGS. 2D and 2E show abstracted behaviors of two different types of storage devices. The flowchart of FIG. 2D illustrates how data propagates through a pipeline where the storage device of a stage contains two storage nodes (as in a non-split latch pipeline) and the valid and stall indications are only visible at the interface of the storage device, i.e., the behavior is described as a method not dependent on specific implementation details. The flowchart of FIG. 2E illustrates how data propagates through a pipeline where the storage device of a stage contains only one storage node (as in a split latch pipeline). Again the behavior is described as a method not dependent on specific implementation details.

Returning to FIG. 2D, in initialization step 50 the larger circuit (e.g., register, circuit, chip, system, etc.) in which a stage resides, is initialized with data indicated as not valid and no stall is indicated. Note that the steps associated with indications that data is valid or not are optional and hence marked with dotted lines, e.g., 52. In a pipeline where no valid indications exist, the dotted arrows are ignored and dotted boxes are replaced by a solid line. Pipelines only indicating stalls implement a progressively stalled behavior. Pipelines that indicate both valid and stalls implement an interlocked behavior.

After initialization, the pipeline stage under consideration, called the current stage, waits for a triggering event in step 51. When the triggering event arrives the arriving data is checked to see if it is valid or not in step 52. If the data is not valid, no action is performed and we return to step 51. If the data is valid it is stored in an output storage node of the stage in step 54 and the output is indicated as valid in concurrent step 55. When the next triggering event arrives in step 56 the new arriving data is checked for validity in step 57. If it is not valid and the adjacent downstream stage is not stalled in step 58, the current stage will become empty and is indicated as not valid in step 59 and we return to step 51. If the new arriving data is not valid and the downstream stage is stalled in step 58, then the data in the output node of the current stage must be held so we return to step 56. However, since storage space is still available in the internal node of the current stage there is no need to indicate a stall yet.

If the arriving data is valid in step 57 and the downstream stage is not stalled in step 60, the pipeline operates as normal and stores the arriving data in the output node in step 61 and we return to step 56. If the downstream stage is stalled in step 60 however, then the arriving data is stored in the internal storage node of the current stage and the stage needs to stall as in step 62 as there are no more empty storage nodes available to receive additional data. Once stalled, the current stage waits by looping through steps 63,64 until the downstream stage is no longer indicated as stalled in step 64 at which time the current stage moves the data currently in the internal node to the output node, and indicates that it is no longer stalled as in step 65 and we return to step 56.

Now consider the operation of a two phase, or similar type, pipeline as described by FIG. 2E. Again, lines and boxes associated with valid indications are dotted and are ignored in pipelines without valid indications. After initialization in step 70, the pipeline stage in question, called the current stage, waits for an odd numbered triggering event in step 71. When the triggering event arrives the arriving data is checked to see if it is valid or not in step 72. If the data is not valid, the output node, if not already, is indicated as not valid in step 73 and we return to step 71. If the data is valid in step 72 it is stored in the output storage node of the stage in step 74 and the output is indicated as valid in concurrent step 75. At the next even numbered triggering event in step 76, only the stall status of the stage is updated, the data storage device does not store new data. If the downstream stage indicates a stall in step 77 after the even numbered triggering event arrives in step 76, the current stage stalls as in step 78 and waits for the next even numbered trigger event in step 76. If the downstream stage is not indicated as stalled in step 77, then the stage is unstalled (if it was stalled) as in step 79 and we return to step 71 to wait for the next odd numbered triggering event.

Note that for precharged stages, such as precharged domino logic, step 74 includes first evaluating the stage before storing the evaluated data in the output node, and step 79 includes the precharging of the stage. A precharged stage normally evaluates and precharges on alternate triggering events (odd vs. even). When a precharged stage is stalled, the data is held in the output storage node of the precharged logic. No precharging and no evaluation takes place in a stage while the stage is stalled.

In the described fashion the extra storage space found in, for example, many modern synchronous pipelines can be used advantageously by the present invention to allow a cost-effective progressive, stage by stage, "cycle by cycle", stalling by allowing the stall indication to upstream stages to be delayed while filling in the empty storage nodes with arriving data.

There are several fundamental differences in the stalling of a pipeline stage in the present invention to that of the stalling of a stage in a prior art asynchronous pipeline of which some are outlined below. First, the techniques of the present invention allows stalling of pipelines where the stages operate in lock step, or similar, fashion as opposed to asynchronously. Second, the present invention enables the effective storage capacity in stalled portions of the pipeline to be doubled, or more, by realizing the possibility of storing multiple data items in stages with multiple storage nodes, such as pulsed master-slave latches, flip-flops, and sense-amplifier latches. Third, the present invention makes use of a nacking, rather than acking, stall protocol. Nacking protocols cannot be used as the sole means of operating an asynchronous pipeline, but do work fine in, for example, any pipeline where a triggering event can be used to sample the value of the stall signal as, for example, in a synchronous pipeline.

The following sections of the preferred embodiment will describe the methods and techniques of progressively stalled and interlocked pipelines in more detail. As outlined above, the pipeline does not necessarily have to be synchronous, but may in fact be locally clocked or asynchronous instead. However, to facilitate understanding of the present invention the below described detailed examples are presented in the context of synchronous pipelines for example only. Application of the present invention to locally clocked and asynchronous pipelines are simple variations of the methods and techniques presented herein with reference to the below described detailed examples which are readily apparent to one skilled in the art. Similarly, application of the ESP and ISP techniques of the present invention to different types of storage devices (e.g., latches) and different implementations of the local trigger event logic (e.g., clock splitter logic) is readily apparent to one skilled in the art.

Thus, according to a preferred embodiment of the present invention with regard to synchronous pipelines, clock gating is provided at the individual pipeline stage (or individual latch macro) level. In a first preferred embodiment, an Elastic Synchronous Pipeline (ESP) pauses/stalls stages (i.e., gates off each stage's clock to stall that stage) in reverse synchronous order from a detected stall condition. A second preferred embodiment, an Interlocked Synchronous Pipeline (ISP) is an enhancement of ESP that employs a valid data signal for optimal local clock gating that is based on both data valid and stall conditions. The present invention avoids the aforementioned progressive stalling problems by allowing data to be stored in both master and slave latches/stages during stall conditions, thereby doubling the effective pipeline storage capacity.

Above described state of the art approaches to clock gating provide far from optimal power savings. Clock gating has traditionally been performed at the coarse-grained unit level based on unit inactivity. Only recently have pipeline clocks been gated at the more fine grained, pipeline stage level based on data validity. The inventors have discovered that clock gating based on stall conditions not only provides considerable clock related power savings, but also improves data path delay, power, and area by removing the need for data hold multiplexors. It is estimated that the present invention may save twice as much clock power as prior art approaches by gating at the fine grained pipeline stage level.

Figure 3A:
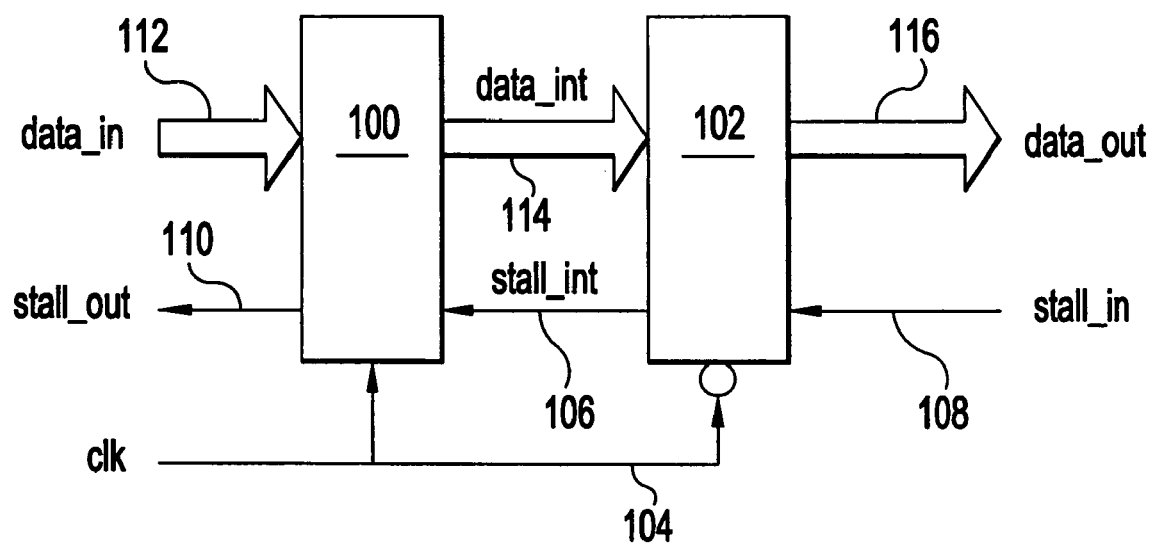
FIG. 3A shows a representative example of a typical pair of series connected register stages illustrating a preferred embodiment Elastic Synchronous Pipeline (ESP)

FIG. 3A shows a representative example of a typical pair of series connected register stages 100 and 102 (each representing multiple individual latches in a particular stage, e.g., master or slave) of a first preferred embodiment Elastic Synchronous Pipeline (ESP), clocked by global clock (clk) 104. A register-enable signal input 106, 108 to each register controls whether the particular register 100, 102, respectively, switches at its respective clock edge or maintains its current data (pauses/stalls) because the pipeline is stalled at a downstream stage. Enable input 106 is also a stall indication output from stage 102. Stage 100 also includes a stall indication output 110. Stall indication outputs 106, 110 are latched outputs that indicate to the adjacent upstream stage that the respectively stage 102, 100 is paused/stalled. In this example, the register stages 100, 102 become opaque (latched) and transparent (passing its input 112, 114 to its output 114, 116, respectively) on opposite edges of the clock, i.e., at falling and rising clock edges. In this example, when both register enable inputs 106, 108 enable the clock, the corresponding register stages 100, 102 sequentially store data, i.e., become opaque at falling and rising clock edges, respectively. Data can be trapped in either/both register stages 100, 102 by dropping register enable inputs 106, 108, thereby holding respective registers 100, 102 opaque.

Synchronous pipelines traditionally prevent data races between latches by alternating the transparency and opaqueness of latches in adjacent register stages. The traditional approach to this technique is based on level sensitive transparent latches where a two phase clock is used such that only every other pipeline stage is active at a time, the latches in inactive stages are opaque and act as barriers preventing data races between the transparent latches of active stages. Similarly, in a pipeline where a master slave latch represents a pair of stages the master and slave latches alternate between transparent and opaque modes such that there is never a combinational path between two master latches or two slave latches.

These split latch and non-split latch approaches are notably similar. The only fundamental difference is that the split latch pipeline has combinational logic between each array of latches (or pipeline stage), while the non-split latch pipeline only has combinational logic between master/slave latch stage pairs. Another approach to prevent data races is to add delays to the short paths between latches. This approach allows the use of pulsed latches to save clock power. In both approaches transparent stages contain data and opaque stages contain what is referred to herein as bubbles. Although described hereinbelow in the context of two phase split latch pipelines with level sensitive transparent latches, it is understood that the present invention has application to many other types of synchronous pipelines.

Elastic Synchronous Pipeline (ESP)

Figure 3B:
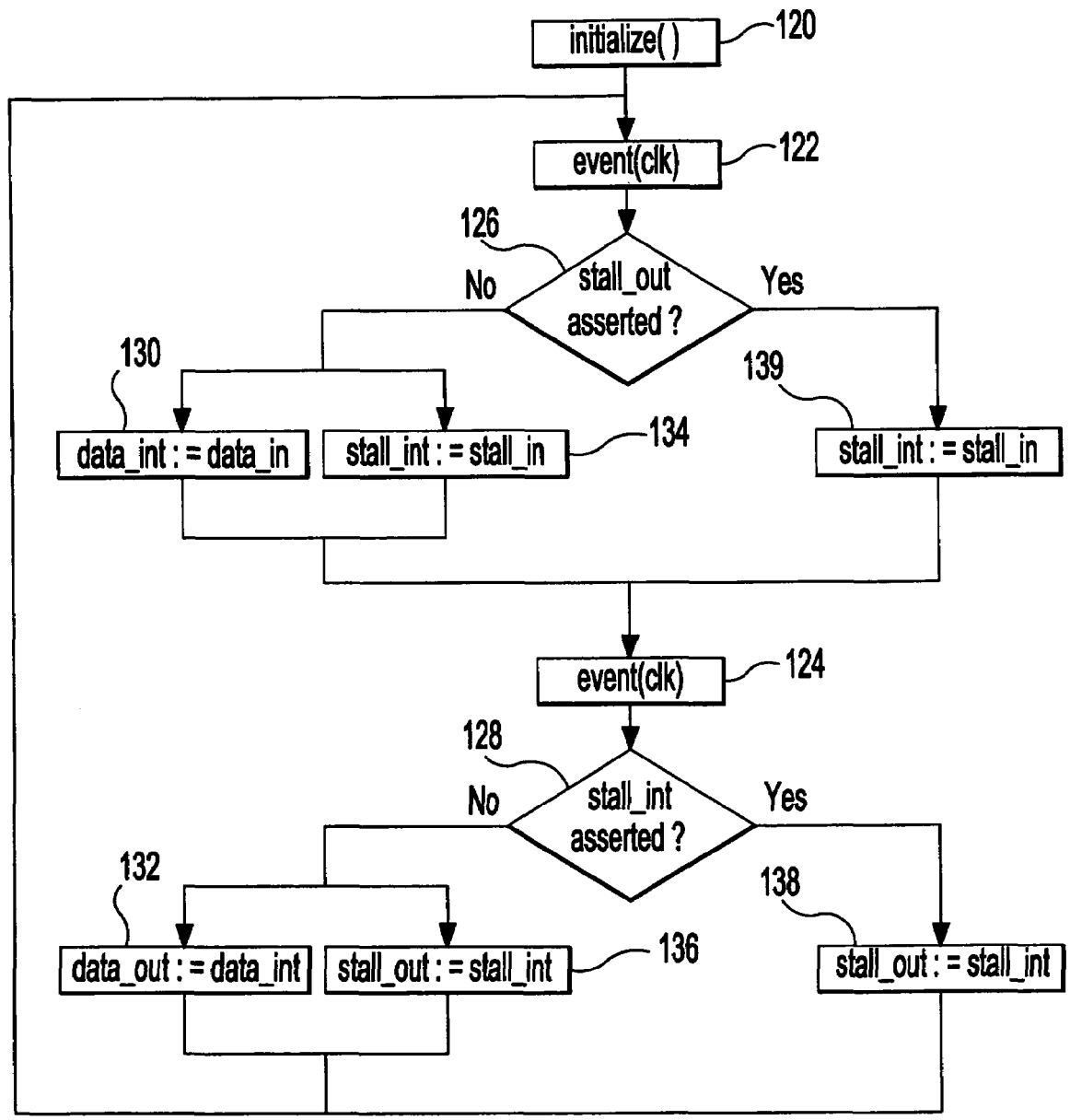
FIG. 3B is a flow diagram showing how data passing through pipeline register stages of FIG. 3A may be paused upon detection of a stall condition in downstream stages.

FIG. 3B shows a flow diagram showing how data passing through synchronous pipeline register stages 100, 102 of FIG. 3A may be paused/stalled upon detection of a stall condition. Under normal operating conditions, the data latches for an active stage are transparent. When an active stage receives a stall signal from immediately following logic or from a downstream stage, the data latch goes opaque on the next clock edge and remains opaque until the stall condition goes away. According to this first preferred embodiment of the present invention, the data latches are held opaque by gating the local clock with the stall signal. The stall signal in turn is propagated backward in the pipeline and is kept synchronized to the pipeline by latching it at each pipeline stage. The stall signal thus propagates only one stage per clock edge, and is thereby kept local to each stage.

So, in initialization step 120 the larger circuit (e.g., register, circuit, chip, system, etc.) in which the register stages 100, 102 reside is initialized with the global clock 104 low. Since the pipeline is initially empty, the registers 100, 102 operate substantially identically to other state of the art registers with each subsequent arrival of a respective clock edge in steps 122 and 124. In steps 126, 128, respectively, stall outputs 110, 106 are low indicating that no stall has yet been detected and data is passed through the particular stage 100, 102 in steps 130, 132. Coincidentally, in steps 134, 136, the register enable signal (stall signal) is propagated back through the respective stage 102, 100 as an input to the adjacent upstream stage.

When a stall occurs at a downstream stage, the stall signal propagates back stage by stage, clock edge by clock edge, until it reaches register enable input 108 of register 102. Likewise, if a stall occurs in the stage immediately following stage 102, the stall signal is provided to register enable input 108. Since neither stall indication is high, in step 126 output 110 is checked and in step 130 upstream data is latched into latch 100. Simultaneously in step 134, the stall signal is passed through from enable input 108 to stall signal indication output 106. In step 124 at the next clock edge in step 128 stall signal indication output 106 is checked, where a stall condition now has been detected. So, only the enable input (stall signal indication output 106) to latch 100 is passed in step 138 to reflect the stall at stall signal indication output 110. Data in both registers 100, 102 remains unchanged. Thus, when the next clock edge arrives at step 122, the stall signal indication output 110 is high; and, only the stall signal state at enable input 108 is passed to stall signal indication output 106. Again, stages 100, 102 are paused/stalled, storing any data contained therein.

Eventually, the stall condition ends and the stall indication signal at register enable input 108 switches its state to indicate that change. At the first clock edge in step 122 after the state switch, in step 126 stall signal indication output 110 is unchanged and so, the switched stall signal is passed through from register enable input 108 to stall signal indication output 106. Since the stall condition has ended, the data that had been held in stage 102 is stale with the results of that data already latched in the adjacent downstream pipeline stage. So at the arrival of the next clock edge in step 124, the check of stall signal indication output 106 indicates that stage 102 is no longer paused and in step 132 the data in stage 100 is passed through stage 102. Simultaneously, the switched stall signal is passed through from enable input 106 to stall signal indication output 110. Thereafter, the stages 100, 102 operate normally until the next stall condition is detected or propagates back from a downstream stage.

Accordingly, any two data items can be sequentially paused/stalled (stored) in a pair of adjacent, synchronously clocked stages, leveraging the elastic nature of preferred embodiment pipelines. Further, this sequential storing of data through clock gating (i.e., at 106, 110) uses backward interlocking in a synchronous pipeline for stage level handshaking. Each stage generates a stall signal to its upstream neighbor that indicates when the stage is ready/not ready to receive new data.

Figure 4A:
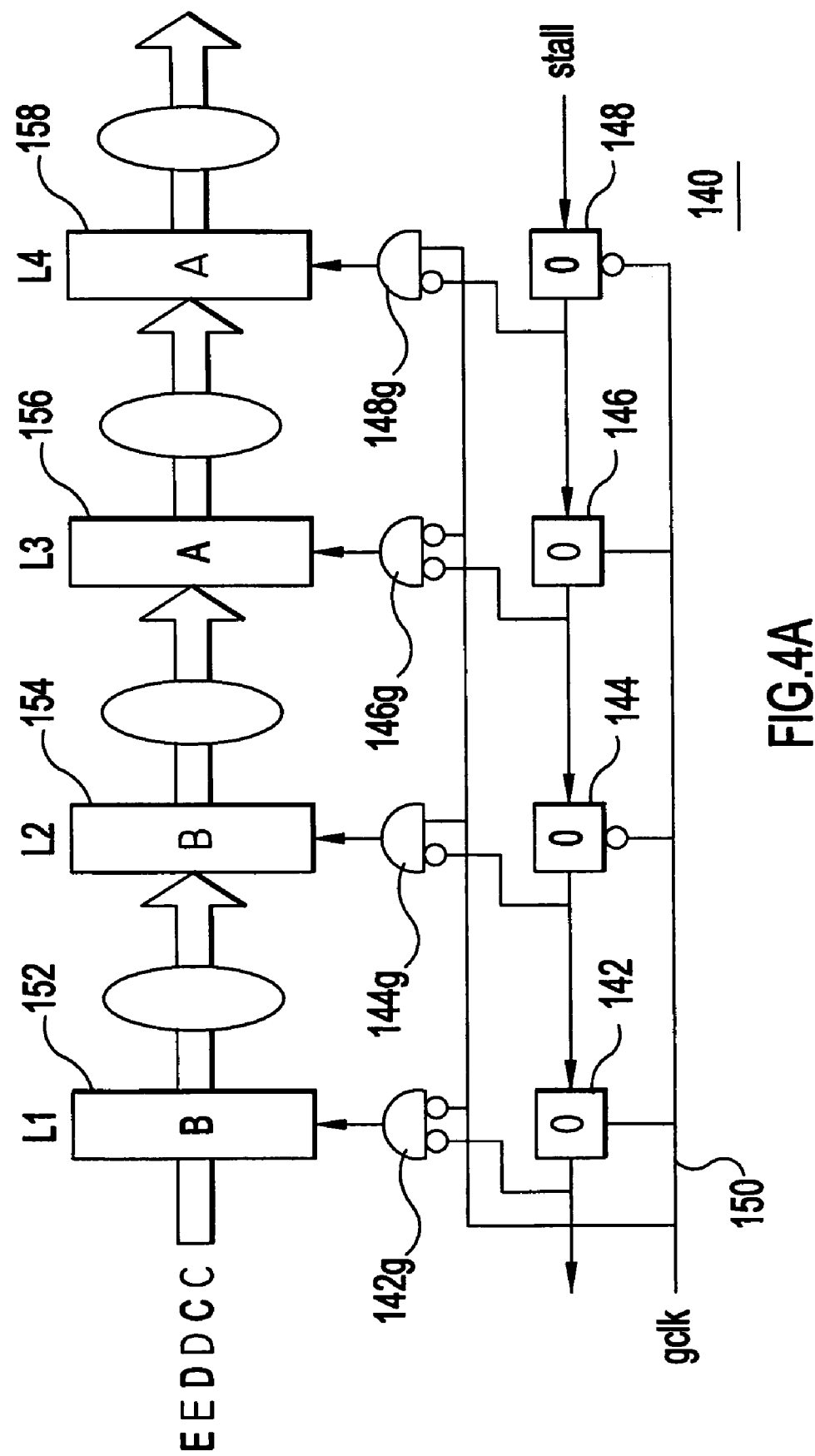
FIG. 4A shows an example of a four stage, two phase split latch pipeline with stall latches at each stage, propagating the stall signal backward in the pipeline.
Figure 4B:
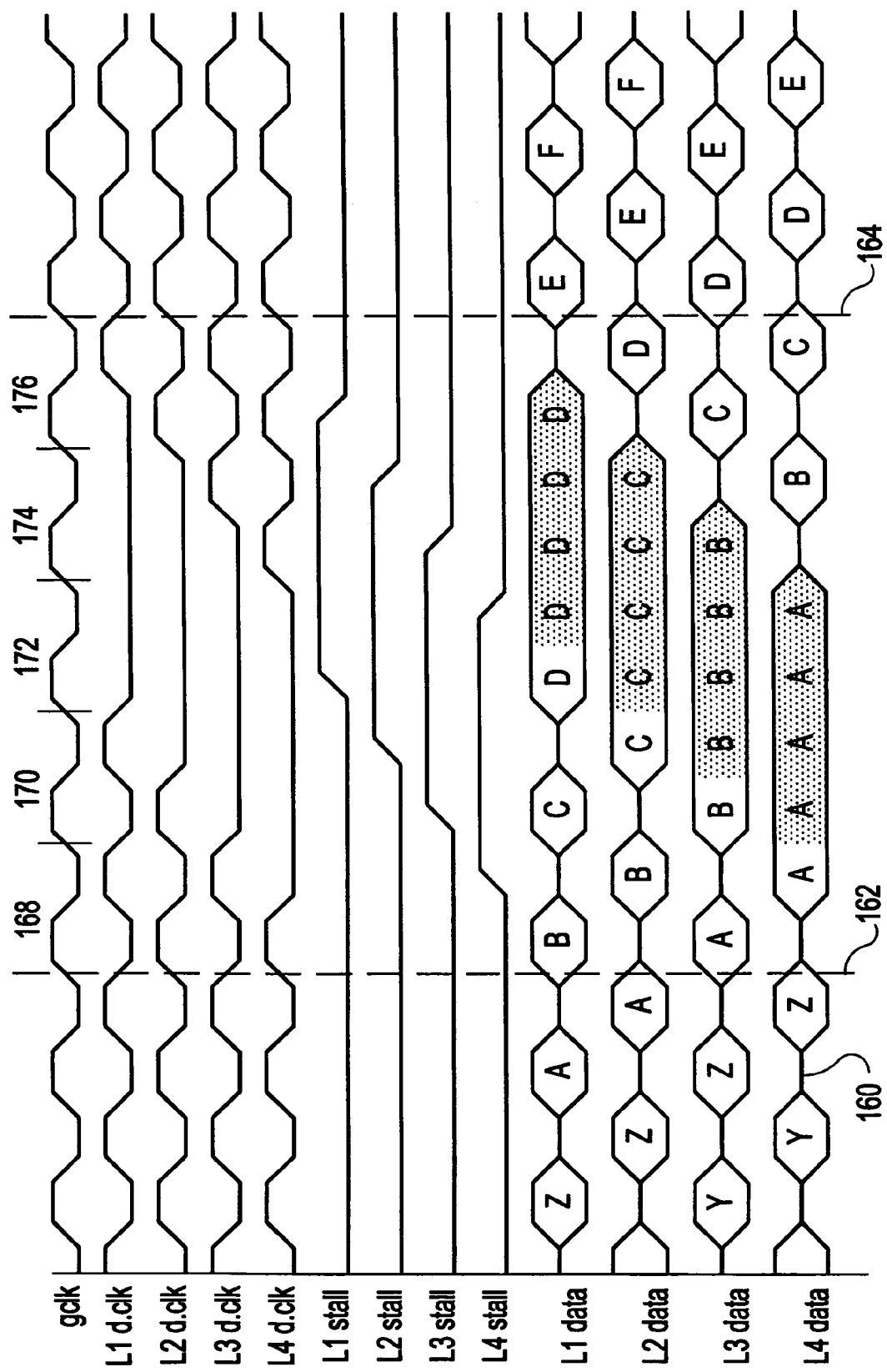
FIG. 4B is a corresponding timing diagram for the four stage, two phase pipeline of FIG. 4A.

FIG. 4A shows an example of a four stage, two phase split latch pipeline 140 with individual stall latches 142, 144, 146, 148 at each stage, propagating the stall signal backward in the pipeline and FIG. 4B is a corresponding timing diagram. The stall latches 142, 144, 146, 148 are clocked by global clock 150 (gclk) on the opposite clock edge as that of their associated corresponding data register stages 152, 154, 156, 158. The global clock 150 to each of the register stages 152, 154, 156, 158 is gated in gates 142g, 144g, 146g, 148g by the output of an associated stall latch 142, 144, 146, 148, respectively. Also in this example, delay gates that may be included to remove the skew between the data and stall latch clocks are not shown.

The timing diagram example of FIG. 4B and the corresponding sub-trace of FIG. 4C illustrate the relationship between global and local data latch clock states along with the stall and data signals for each stage. In this example, each data item progressing through the pipeline is represented by an alphabetic character. In the timing diagram example of FIG. 4B half levels e.g., 160, of data traces indicate that the corresponding stages are transparent. Opaque stages are represented by blocks between half levels with a character representing the corresponding data item currently stored in that stage. The portion between dotted lines 162, 164 corresponds in more detail to the sub trace entries of FIG. 4C with data stream A, B, C, D, E being applied to the pipeline. Enclosed in box 166 highlights how the stall condition propagates backward through the pipeline. Clock periods 168, 170, 172, 174 and 176 between 162, 164, each contain a high and a low phase, which are indicated individually in FIG. 4C by an appropriate period designation followed by a phase designation, e.g., 170*l* or 170*h*. Data (or a stall signal) stored in an the opaque latch (whether gated in normally or held during a pause) is indicated by boldface characters. Data passing through a transparent latch is indicated by non-bold characters.

So, in phase 168*h* the pipeline is in steady state operation with two data items continuously present in this portion of the pipeline. Data register stages 152, 156 are opaque, storing data items B and A respectively. Coincidentally, data register stages 154, 158 are transparent and do not store any data. Stall latches 144, 148 are opaque and stall latches 142, 146 are transparent. Once the next falling clock edge arrives to start 168*l*, data register stages 154, 158 become opaque, storing data items B and A, while the stall latches 144, 148 become transparent. During 168*l* the stall signal (stall) is asserted passing through transparent stall latch 148 to the clock gate 148*g* at data stage 158, which pauses (stalls) data stage 158. Stall latch 146 is opaque. Stalled data stage 158 continues to store data item A after the next rising clock edge arrives to start 170*h*. In clock phase 170*h*, data items C and B are latched into opaque registers 152, 156, respectively. Simultaneously, the asserted stall signal propagates through currently transparent stall latch 146 to the clock gate 146*g*. This disables the clock to opaque data stage 156, which contains B.

When the next falling clock edge arrives to start clock phase 170*l*, both stages 156 and 158 are stalled, opaque and storing data items B and A, respectively. Data stage 154 in turn becomes opaque storing data item C and, the asserted stall signal passes through transparent stall latch 144 to clock gate 144*g*. Transparent data stage 152 passes data item D. The next rising clock edge arrives starting clock phase 172*h* with data stages 154, 156 and 158 stalled and storing data items C, B, and A, respectively. At this time, opaque data stage 152 stores data item D and the asserted stall signal propagates through stall latch 142 to clock gate 142*g*. Upon arrival of the next clock edge to start clock phase 172*l*, all four sections of the pipeline has been safely stalled without losing any data items. All stages in the pipeline are filled with valid data items A, B, C and D.

As can be seen from this example, a stall condition can be considered a sliding window (e.g., 166) moving backward through the pipeline. Outside the stall condition window 166, data is stored normally in every other pipeline stage as is typical for a two phase split latch pipeline. Since all of the latches within the stall condition window 166 are opaque, data is stored in every paused pipeline stage. Thus, preferred embodiment pipelines may be considered elastic due to this adaptive storage capacity.

Unstalling is similar to stalling the pipeline. Essentially, the pipeline data stages 152, 154, 156, 158 are enabled one stage at a time in the same order that they were stalled. This recreates the pipeline bubbles without losing data when data starts moving through the pipeline again. So, in clock phase 172*l*, all stages remain stalled and stall latches 144, 148 are transparent. During this phase, the stall signal is deasserted indicating that the condition that caused the stall no longer exists, i.e., stage 158 no longer need be stalled. The deasserted stall signal propagates through the transparent stall latch 148 to clock gate 148*g*, enabling the clock to data stage 158 such that stage 158 is no longer stalled. Since stage 158 is no longer stalled, the data stage becomes transparent at the next rising clock edge arrival, i.e. at the beginning of clock phase 174*h*. Stages 152, 154 and 156 remain stalled, storing data items D, C, and B. The deasserted stall signal passes through currently transparent stall latch 146 to clock gate 146*g*, enabling the clock to stage 156.

When the next clock edge arrives to start clock phase 174*l*, data item B is latched in opaque data stage 158 and data item C is passed through transparent data stage 156 with stages 152 and 154 remaining stalled and storing data items D and C. The deasserted stall signal passes through transparent stall latch 144 to clock gate 144*g*, enabling stage 154. At the next clock edge arrival to begin clock phase 176*h*, data item C is stored in stage 156 and stages 154 and 158 are transparent. The deasserted stall signal passes through transparent stall latch 142 to clock gate 142*g*, enabling the clock to stage 152. Thus, at the arrival of the next clock edge to start clock phase 176*l* and end the stall window 166, data items D and C are stored in opaque stages 154 and 158, respectively. Transparent stages 152 and 156 are passing data and the pipeline returns to normal steady state operation.

Thus, heretofore unrealized, a two phase pipeline can be stalled progressively as described above because filling bubbles normally present in the pipeline with data items masks the "delay" of propagating the stall signal backward in the pipeline one stage at a time. With N stages (N=4 in the example of FIGS. 4A-C) in a pipeline, normally no more than N/2 data items (2) are present in the pipeline at steady state, while bubbles occupy the remaining N/2 stages. The present invention uses these N/2 bubbles as data buffers during a stall. The stall signal propagates back two stages each clock period and so, takes N clock edges (and N clock phases or N/2 clock periods) to propagate back to the start of the pipeline. During these N phases, new data items continue to enter the pipeline (in a two phase pipeline new data enters the pipeline only every other clock edge). Normally, there is enough (normally unused) buffer storage such that all data can be stored safely. Thus, when all stages have stalled, the pipeline has an occupancy potential of N data items. Likewise, when unstalling the pipeline, the delay introduced by propagating the stall signal backward one stage at a time recreates the pipeline bubbles such that data safely propagates through the pipeline again. With the whole pipeline unstalled, the occupancy potential of the pipeline returns to N/2 data items.

Interlocked Synchronous Pipeline (ISP)

Figure 5:
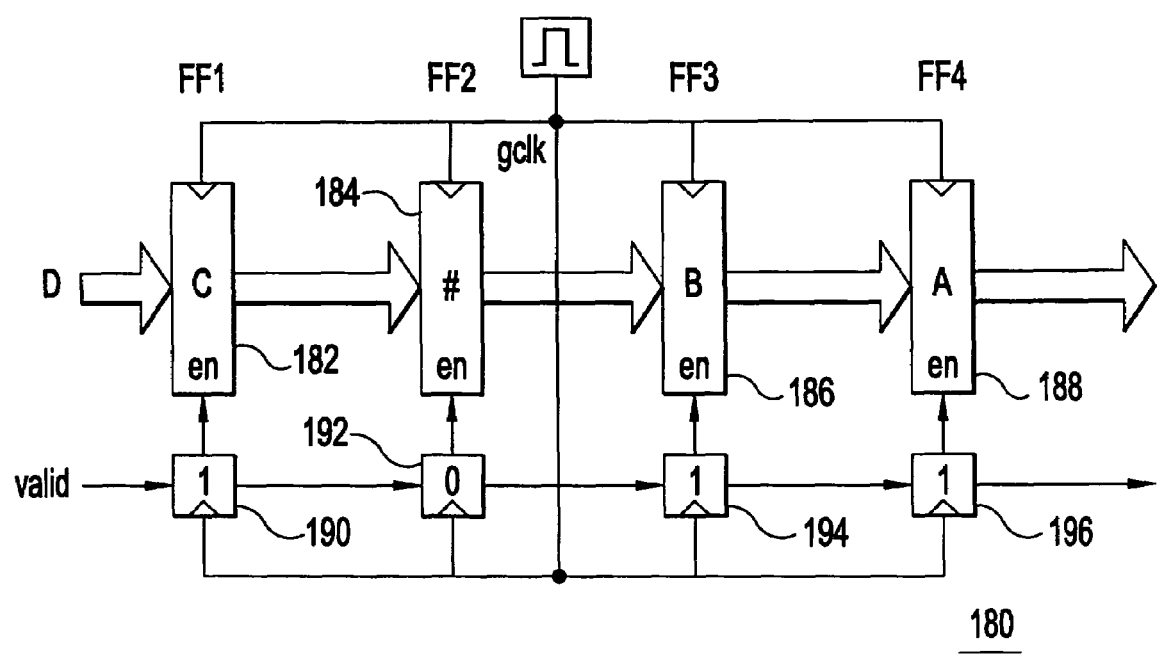
FIG. 5 shows an example of a four stage, two phase split latch pipeline wherein each register stage has a valid bit latch.

The second preferred, ISP embodiment augments the ESP embodiment using valid data signals at each stage to identify holes (absence of a valid data item) in the pipeline where it is unnecessary to pause the pipeline, thus improving throughput. FIG. 5 shows an example of a four stage synchronous pipeline 180, wherein each register stage 182, 184, 186, 188, includes a valid bit latch 190, 192, 194, 196 as is known in the art. As data enters the pipeline 180, it is accompanied by a 1 bit valid data signal or valid data bit that propagates alongside the valid data item in synchronous lock step. In this example, each valid data bit gates the clock to the corresponding stage, blocking the clock when valid data is not present in a particular pipeline stage. Thus in this example, A, B and C indicate valid data in stages 182, 186 and 188, each of which is accompanied by a "1" indicating a valid data item. The hash mark "#" in stage 184 indicates the absence of valid data and is accompanied by a "0" in valid data latch 194. In the ISP embodiment, the ESP decision to stall an upstream stage is modified by determining from the valid bit whether that stage contains valid data and so, should be stalled. Such an ISP embodiment improves pipeline throughput by filling holes and further reduces clock power because with the local stage clock gated by both the valid data signal and the stall signal. Only valid data propagates through the pipeline and power is consumed only in stages with valid data.

So, according to the ISP embodiment, during a stall condition, each valid data latch for each stage must be clock gated together with the data latches to correctly propagate or stall each valid data bit along with its associated data item. Since a stall condition only need propagate backward when the upstream stage contains valid data, a valid data signal or bit that propagates with each valid data item indicates whether the particular stage contains a valid data item that may be lost and, therefore, that must be paused/stalled upon a stall. Thus, when a stage has the valid data bit asserted, the stage may be stalled as described above for ESP; when a stage does not have the valid data bit asserted, its absence overrides the stall bit, effectively stalling the stall bit, until valid data reaches that stage. Including the valid data bit in deciding whether to stall individual stages improves pipeline latency and throughput in the presence of stalls, because data in upstream stages can continue through the pipeline until all holes have been filled. Thus, unless the pipeline completely fills with valid data items, the stall may be transparent to other upstream units external to the ISP.

Further, by interlocking pipelines control whether a data item continues through the pipeline can be decided locally. Therefore, decisions such as whether to clock gate or not clock gate and, whether to pause or restart a pipeline stage can be made independent of other pipeline stages. The ability to perform such local decisions is achieved through handshake interlocking in both directions, forward as well as backward. Handshake signals indicate to neighboring stages whether there is data available and, whether a stage is ready to receive new data or not. Since these are local handshake signals that affect a relatively few latches, clock gating through interlocking techniques can be applied even to very high frequency pipelines.

Figure 6A:
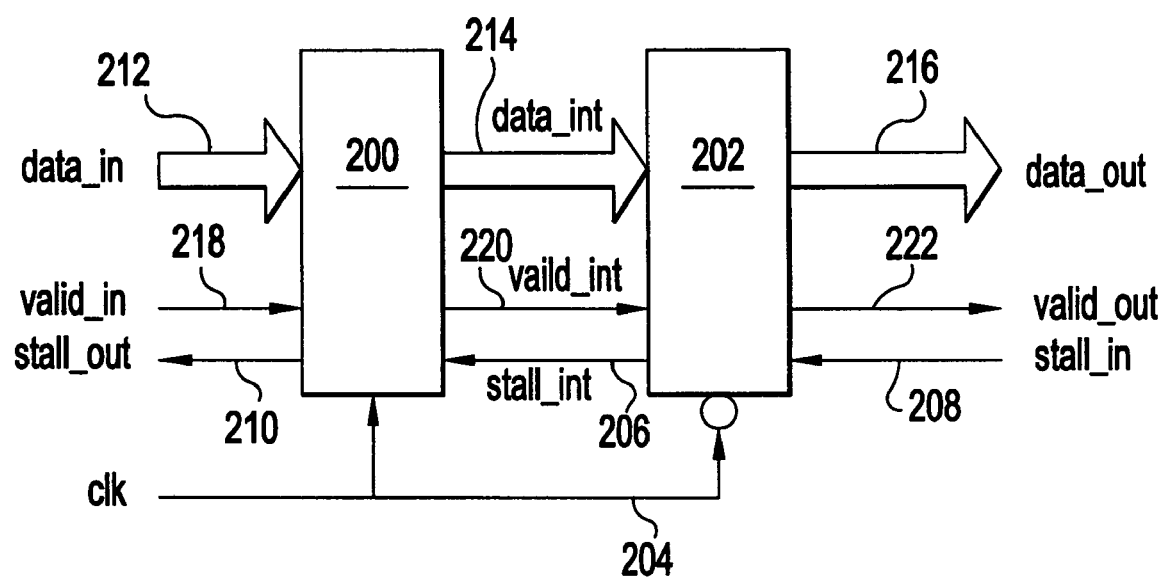
FIG. 6A shows a representative example of a typical pair of series connected register stages illustrating an interlocked synchronous pipeline (ISP) preferred embodiment.

FIG. 6A shows a representative example of a typical pair of series connected synchronous pipeline stages 200 and 202 (each representing multiple individual latches in a particular stage) illustrating the ISP preferred embodiment and substantially similar to the register stages 100, 102 of FIG. 3A. Each stage 200, 202 latches data responsive to a synchronous clock (clk) 204. A stage enable input 206, 208 for a register control signal to each stage, in part controls whether the particular stage 200, 202, switches at its respective clock edge or maintains its current data contents (pauses/stalls) because of a stall condition. Enable input 206 is also a stall indication output from stage 202. Stage 200 includes a stall indication output 210. Stall indication outputs 206, 210 indicate to the adjacent upstream stage that the current stage 202, 200 is paused/stalled. In this example, the register stages 200, 202 become opaque (latched) and transparent (passing its input 212, 214 to its output 214, 216, respectively) on opposite edges of the clock, i.e., at falling and rising clock edges. Each stage 200, 202, also includes a valid data input 218, 220 that indicates that corresponding incoming data 212, 214 is valid; and a valid data output 220, 222 that indicates that the respective stage's output 214, 216 is providing valid data.

In this example, only when both the respective stage enable outputs 206, 210 indicate the absence of a stall and the corresponding incoming data valid bit 218, 220 indicate that incoming data is valid, is the clock 204 enabled for that register stage. When the clock 204 is enabled for both register stages, the register stages 200, 202 sequentially store data, i.e. become opaque at falling and rising clock edges, respectively. Valid data can be trapped in either/both register stages 200, 202 by dropping register control signals to stage inputs 206, 208, thereby holding respective registers 200, 202 opaque.

Figure 6B:
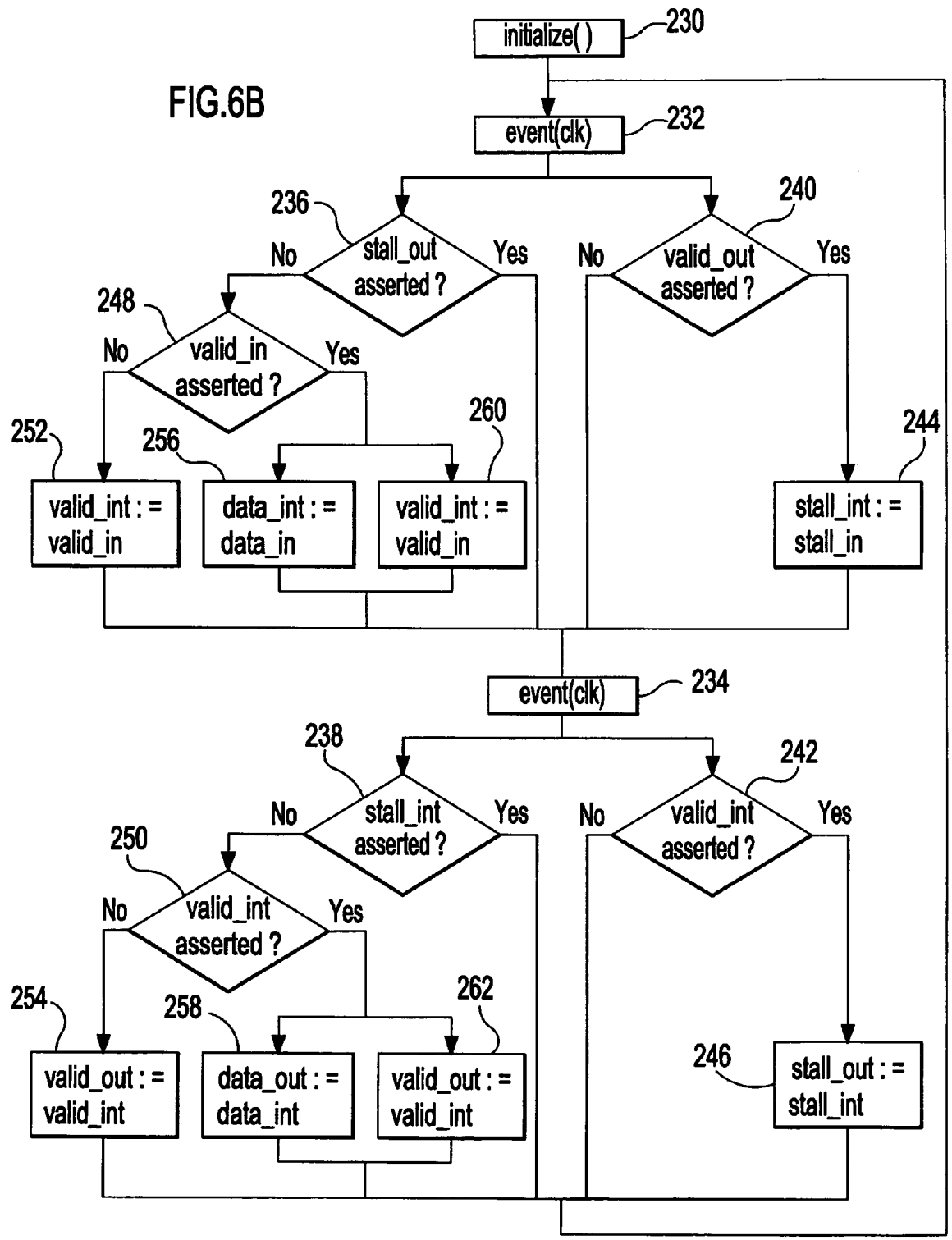
FIG. 6B is a flow diagram showing how data passing through pipeline register stages of FIG. 6A may be paused upon detection of a stall condition.

FIG. 6B is a flow diagram showing how data passing through pipeline register stages 200, 202 of FIG. 6A may be paused during a stall. Under normal operating conditions, only valid data is propagated through the pipeline. When a stall occurs, the foremost stages with valid data go opaque on the next clock edge and remain opaque until the stall condition ends. Valid data in earlier stages continues to propagate through the pipeline until it reaches the last unstalled stage, i.e., wherein the adjacent downstream stage is stalled, at which time that stage is paused/stalled. According to this ISP preferred embodiment, the data latches are held opaque by gating the clock with both the stall signal and the corresponding data valid bit. The stall signal in turn is propagates backward in the pipeline until it encounters empty stages and is kept in synchronous lock step to the pipeline by latching it at each pipeline stage. The stall signal thus propagates no more than one stage per clock edge, filling holes as it propagates and is thereby kept local to each stage with valid data.

So, in initialization step 230 the larger circuit (e.g., register, circuit, chip, system, etc.) in which the register stages 200, 202 reside is initialized with the global clock 204 low. Since the pipeline is initially empty, the registers 200, 202 operate substantially identically to other state of the art registers, upon each arrival of a respective clock edge in steps 232 and 234. In steps 236, 238, respectively, stall outputs 210, 208 are not asserted because, initially, a stall has not been detected yet. Coincidentally and in parallel, valid data signal outputs 222, 220 are checked in steps 240, 242 to determine whether the stall bit should be propagated. Each respective stall bit is propagated in steps 244, 246, only if the corresponding data valid output 222, 220 is asserted. Thus, the stall output 210, 206 is not asserted in steps 236, 238 if either, a stall condition is not propagating back through the pipeline or, the respective stage 200, 202 does not contain valid data. If a stall output 210, 206 is not asserted in steps 236, 238, then in steps 248, 250, the data valid inputs 218, 220 are evaluated to determine if valid data is being provided to a respective stage 200, 202. If a data valid input 218, 220 indicates that valid data is available, then in steps 252, 254 only the data valid input bit 218, 220 is passed to data valid outputs 220, 222. Otherwise, when valid data is provided to either/both stage inputs 212, 214, coincidentally data is passed through the particular stage 200, 202 in steps 256, 258 and the data valid input bit 218, 220 is passed to data valid outputs 220, 222 in steps 260, 262.

When a stall occurs in a downstream stage, a stall signal propagates back stage by stage, cycle by cycle, until it reaches clock enable input 208 of latch 202. Likewise, if a stall occurs in the stage immediately following stage 202, the stall signal is provided to clock enable input 208. If neither stage 200, 202 contains valid data, the stall indication continues to be ignored and in steps 252, 254, only the valid data signal state is latched and forwarded in stages 200, 202 until valid data arrives at the second stage 202, i.e., valid_out is asserted. With valid_out asserted, the stall signal begins to propagate back through the stage 202 in step 244. However, when the stall indication first arrives, neither stall indication output 206, 210 is asserted when output 210 is checked in step 236. In step 248 the valid data bit input 218 for upstream data is checked. If valid data is being provided, both the data and the corresponding valid data signal are latched into stage 200 in steps 256, 260; otherwise, only the valid data signal is latched in step 252.

In step 234 at the next clock edge, it is determined when stall signal indication output 206 is checked in step 238, that a stall condition has occurred and stage 202 is paused. Simultaneously, in step 242 the contents of stage 200 are checked and if they are not valid, the stall signal is not propagated back; otherwise if in step 242 stage 200 is found to contain valid data, then in step 246, the stage enable input (stall signal indication output 206) to stage 200 is passed to reflect the stall condition at stall signal indication output 210. Data in both registers 200, 202 remains unchanged. Thus, when the next clock edge arrives at step 232, the stall signal indication output 210 is high; and in step 244, only the stall signal state at stage enable input 208 is passed to stall signal indication output 206. Again, data in both registers 200, 202 remains unchanged and the stages 200, 202 are paused. Any holes that may have existed between the two data items in stages 200, 202 have been eliminated during the selective pause/stall of these two stages. Thus, some of the degraded performance that occurred from stalling the foremost data item in stage 202 may be recovered by subsequent data items.

Eventually, the stall condition ends and the stall indication signal at stage enable input 208 switches state to indicate that change. At the first subsequent clock edge in step 232 the stall signal indication output 210 is unchanged in step 236 and so, stage 200 is unchanged. Again, simultaneously and in parallel, in step 240 it is determined that stage 202 contains valid data and in step 244, the switched stall signal passes through from stage enable input 208 to stall signal indication output 206. Since the stall has ended, the data that had been held in stage 202 is stale; the results of that data has already been latched in the adjacent downstream pipeline register stage. So, at the arrival of the next clock edge in step 234, the check of stall signal indication output 206 indicates that stage 202 is no longer paused and in step 250, incoming data is checked to determine if it is valid. Valid data in stage 200 and its associated data valid signal are passed to stage 202 in steps 258, 262; otherwise, only the valid data signal is passed in step 254. Simultaneously, in step 246 the switched stall signal is passed through from stage enable input 206 to stall signal indication output 210. Thereafter, the stages 200, 202 operate normally until the next stall is detected and propagates back from a downstream stage.

Figure 7A:
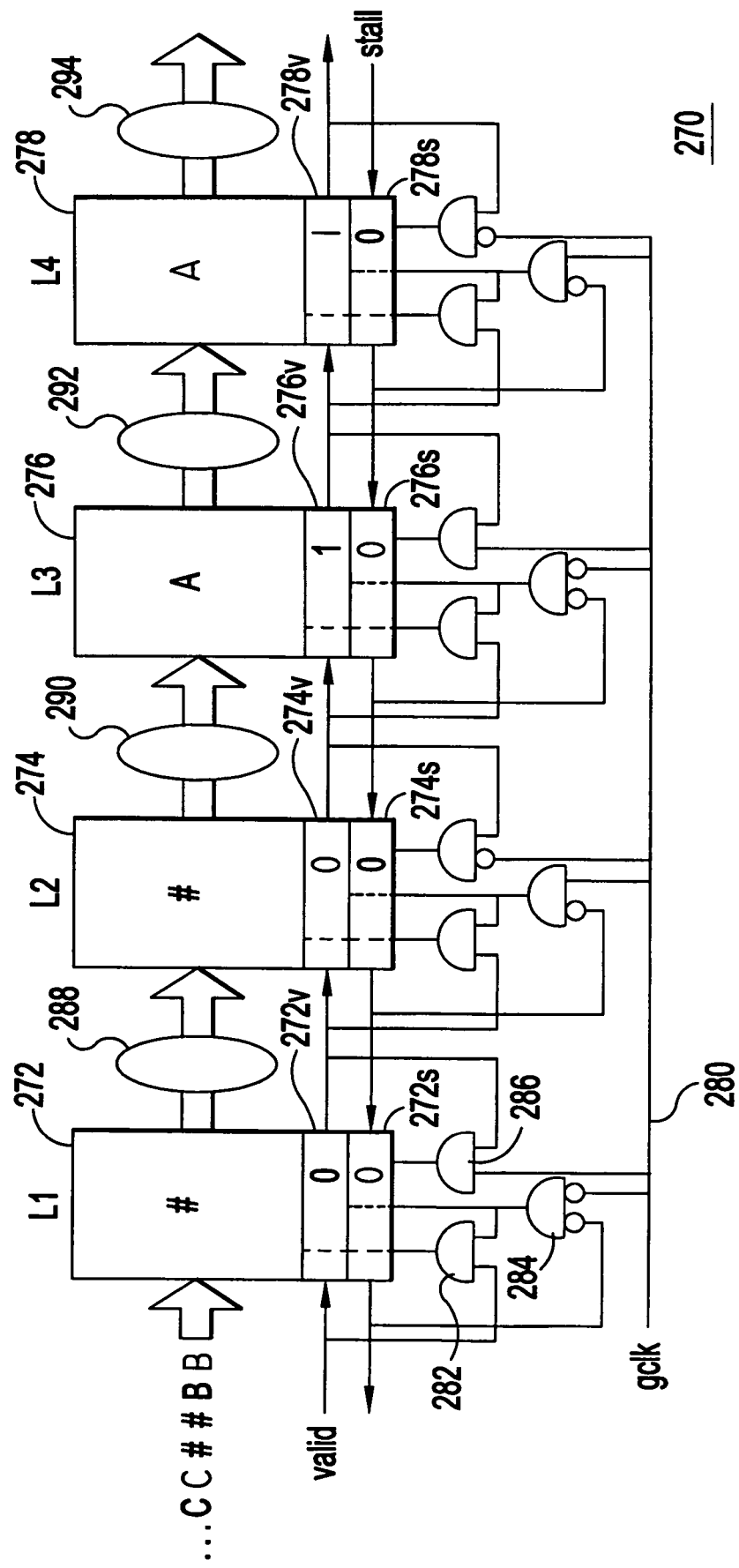
FIG. 7A shows an example of a four stage, two phase split latch synchronous pipeline with early valid, each stage including both an internal interlocking stall latch and a valid data latch.

FIG. 7A shows an example of a four stage, two phase synchronous pipeline 270, each stage 272, 274, 276, 278 including an internal stall bit latch 272s, 274s, 276s, 278s and a valid data bit latch 272v, 274v, 276v, 278v for forward and backward interlocking and clocked by global clock (gclk) 280. Logic gates, e.g., 286, 284 and 282 at each stage 272, 274, 276, 278 gate global clock 280 to the respective stall latch, valid data bit latch and register data latches. The input to the valid data bit latch 272v, 274v, 276v, 278v indicates that associated data is valid and should be passed to intervening logic 288, 290, 292 or 294. Each stall latch 272s, 274s, 276s, 278s is clock gated by the output of an associated valid data latch 272v, 274v, 276v, 278v. This ensures that holes in the pipeline are filled by preventing the stall from propagating upstream when there is no valid data present.

Figure 7B:
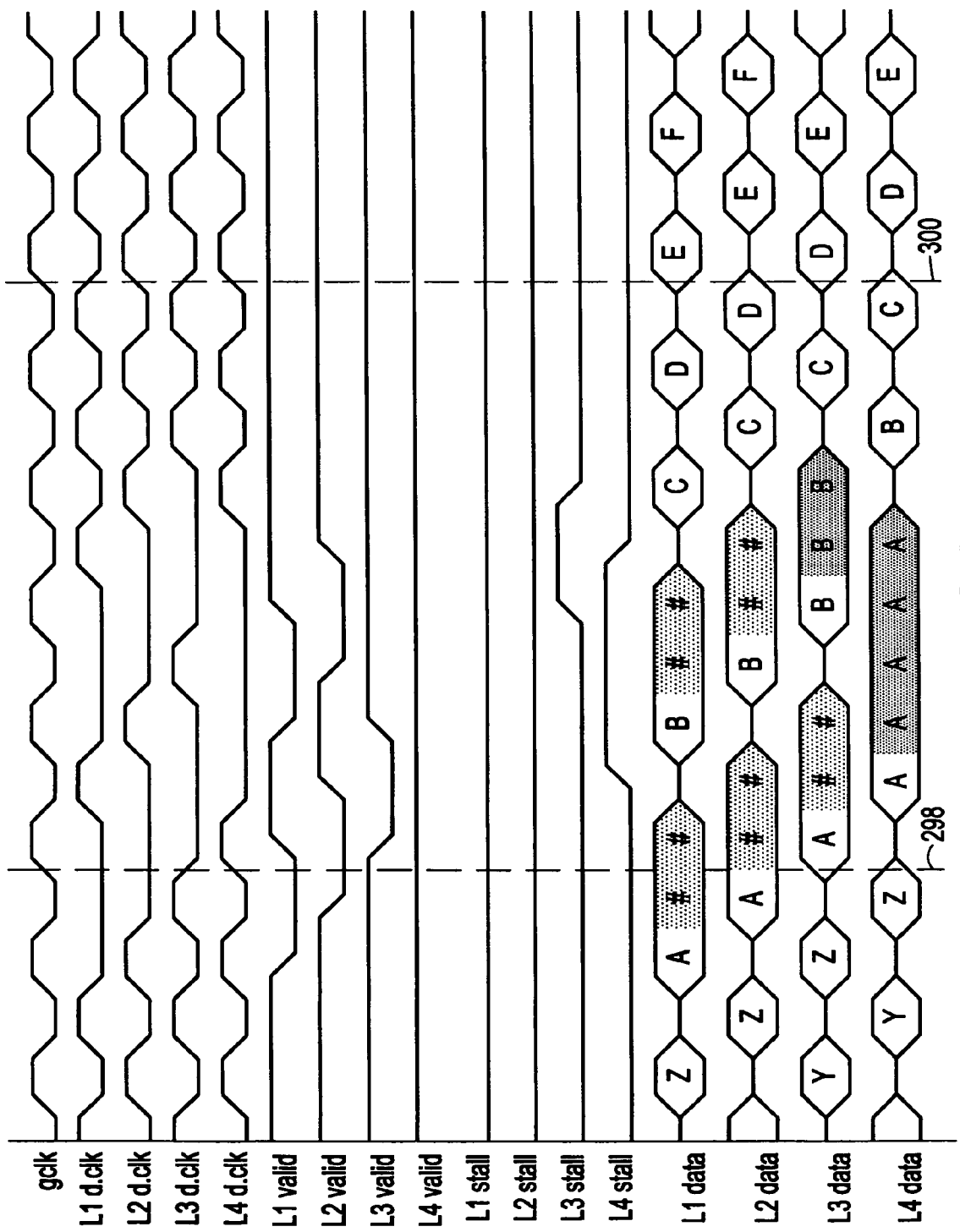
FIG. 7B is a corresponding timing diagram for a four stage, two phase synchronous pipeline as in FIG. 7A.
Figure 7C:
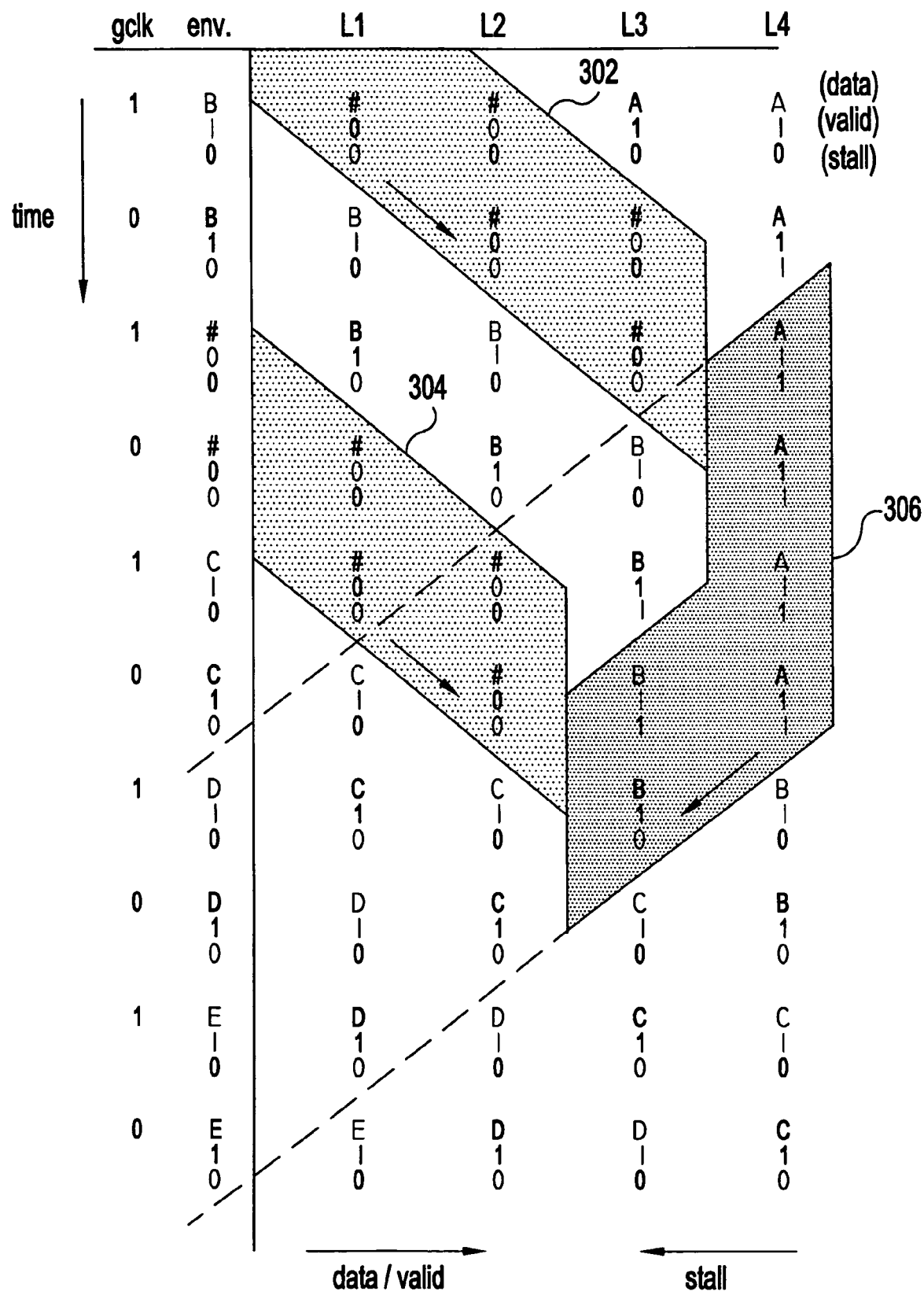
FIG. 7C is a detailed sub trace of a section of the timing diagram of FIG. 7B.

FIG. 7B is a corresponding timing diagram and FIG. 7C is a detailed sub trace of FIG. 7B between dotted lines 298, 300. As in the example of FIGS. 4B-C, each data item progressing through the pipeline is represented by an alphabetic character. Invalid data (a hole) is represented by a # symbol. Data trace half levels indicate that the corresponding stages are transparent. Opaque stages are represented by blocks between half levels with a character representing the corresponding data item currently stored in that stage. Under normal operating conditions, the data latches for an active stage are transparent and only valid data is propagated through the pipeline. When an active stage generates a stall signal, the data latches with valid data go opaque on the next clock edge and remain opaque until the stall condition goes away. Valid data continues to propagate through the pipeline, filling holes until it reaches a stage wherein the adjacent downstream stage is stalled, at which time that stage is paused/stalled.

Valid data signals propagate forward in the pipeline with valid data. As with the above described ESP embodiment, stall signals propagate in the backward direction of the pipeline. A stall bit indicates when the pipeline must halt, for example, due to access conflicts at a shared resource.

With a typical globally stalled synchronous pipeline, stall control logic fills holes and handles stall signals generated by multiple stages. The control logic introduces delays from long global wires, from additional stall control logic and from stall signal fan out, which grows linearly with the number of stages being driven. These pipeline control delays impact the cycle time in prior art synchronous pipelines. By contrast in a preferred embodiment interlocked pipeline, the stall control logic is contained locally to each stage and so, only adds a small constant delay. Locally stalled pipelines, therefore, have an advantage of improving slack on stall signals because they are locally latched and originated.

In the sub trace of FIG. 7C, the data stream A, #, B, #, C, D, E is applied to the pipeline 270 of FIG. 7A. Since essentially, invalid data is a don't care, it need not normally propagate through the pipeline 270, provided valid data item following invalid data position does not arrive at the end of the pipeline too soon. A valid data item arriving too soon would have to be stalled there. Pipeline stalls can act to delay following valid data items such that such a valid data item can only arrive after its desired arrival time, causing delays in other pipelines or units. So, for each stage 272, 274, 276, 278, the accompanying valid data signal gates locally, blocking the clock to the stage 272, 274, 276, 278, whenever the corresponding valid data signal is a zero. As above, bold text in the trace indicates when data (or valid/stall) is stored in a corresponding stage, i.e., the stage is opaque. Non-bold text indicates that data (or valid/stall) is passing through the stage, i.e., the stage is transparent. Polygons 302, 304 illustrate how the clock gated holes propagate forward in the pipeline. Polygon 306 illustrates how the clock gated stall propagates backward in the pipeline.

When data item A reaches stage 278 a stall is generated for two consecutive clock cycles, illustrated by polygon 306. In an elastic pipeline of the ESP embodiment, the stall condition propagates backward in the pipeline unchanged, stalling each stage including stages with holes for two cycles as described herein above. In an ISP embodiment, however, when a hole is encountered the valid data bit latch contents overrides the stall condition by blocking the clock to the stall latch allowing valid data items to continue until it reaches the stalled latch. Thus, the stall window 306 is truncated when it encounters an invalid window 302, 304. The override in turn cancels out the invalid data condition when the hole gets filled with valid data, resulting in the stall window 306 truncating invalid windows 302, 304.

So, in this example the input data stream contains two holes, one after data item A and another after data item B.

Thus, according to the ISP embodiment of the present invention, rather than stalling all stages for two cycles, stage 278 stalls for two cycles, while stage 276 stalls only for one cycle, and stages 274 and 272 do not stall at all. The stall condition is shortened by one cycle at stage 276 which, during the first stall cycle, contains an invalid data entry (#) or a hole that follows data item A. The invalid data signal accompanying the invalid data entry overrides the asserted stall signal to fill in the hole in the pipeline at stage 276. Thus, the first cycle of the two cycle long stall window is therefore zeroed out at stage 276 and does not propagate backward in the pipeline. So, rather than being stalled in stage 274 for two cycles, data item B instead propagates to stage 276 filling the hole there and stalling for one cycle only. Similarly, the invalid data entry following data item B propagates to stage 274 such that as the remaining second cycle of the stall window reaches stage 274, the hole there is filled and zeroes out the stall window completely. Due to the holes in the pipeline, the stall condition never reaches past stage 276, much less to the start of the pipeline or before, and the input environment does not need to stall. Therefore, data items C and D do not stall in the data stream but rather, propagate through the pipeline in a normal fashion.

Although the ESP and ISP embodiments have been described hereinabove with reference to two phase clocked pipelines with split and non-split master/slave registers based on transparent latches, the present invention has equal application to any register structure with two storage nodes or on pulsed latches as are further described hereinbelow.

Figure 8:
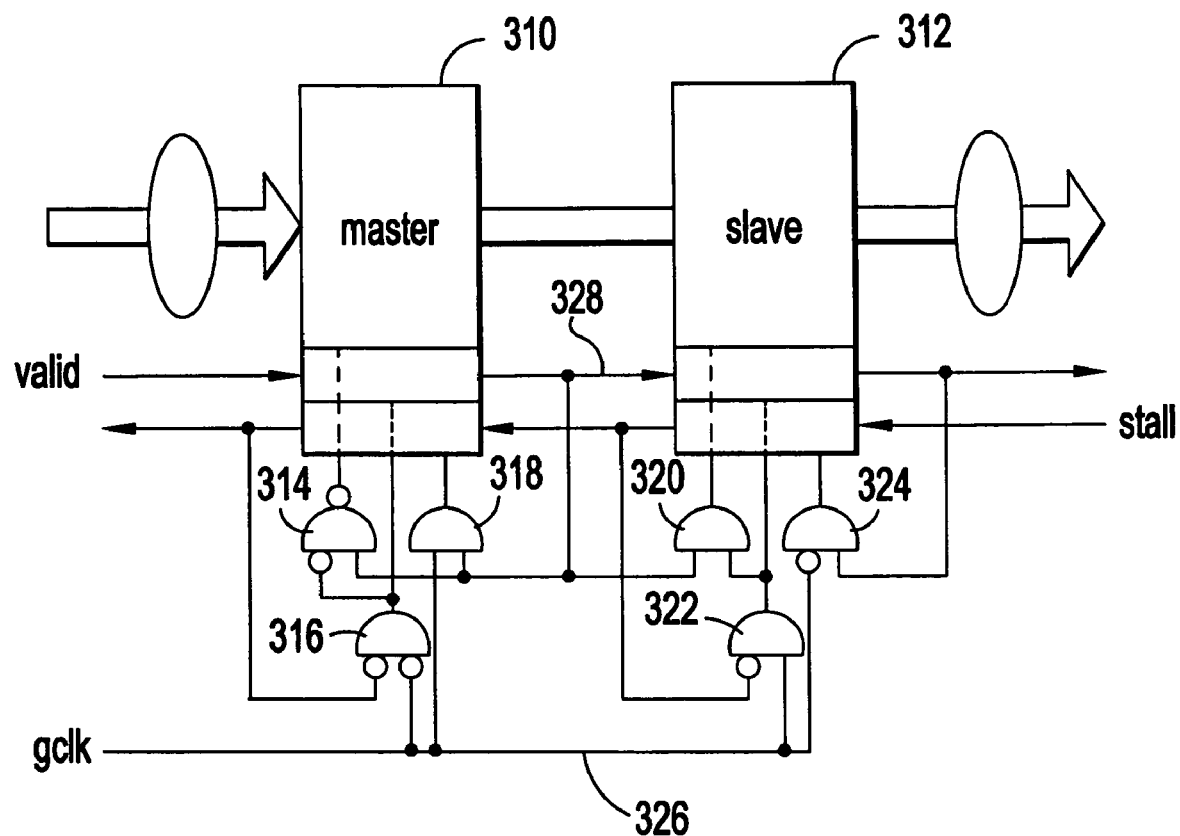
FIG. 8 shows an example of a two phase clocked non-split latch master/slave stage pair ISP embodiment.

FIG. 8 shows an example of a stage pair 310, 312 with interlock logic gates 314, 316, 318, 320, 322, 324 for such a two phase clocked non-split latch master/slave based ISP embodiment. The clock 326 is gated at the end of each clock cycle after new data has been received, rather than at the first clock edge as in the two phase, split latch ISP embodiment with early valid. The valid data signal must be in phase with the clock to guard against local clock gating glitches; therefore, the valid data signal 328 from the master latch 310 gates the master latch clock in gate 318, the slave stage clock in gate 320 (after it is gated by the internal stall signal in gate 322), as well as the master stall latch in gate 318.

It is understood that this master/slave pair 310, 312 is for example only and that, the present invention may be applied to any suitable glitch-free (hazard free) adaptation of local clock gating to a master/slave pipeline for stage interlocking. Valid data and stall signals must meet standard synchronous timing constraints for clock gating.

In a two phase pipeline with early valid, glitches on the valid data signal are filtered out by the clock gating for each stage, by assuring that the clock is not active during the valid data signal output settling time. During this settling time, the valid data signal stabilizes before the next clock edge arrives at the end of the first half of the clock cycle. However, in a late valid pipeline, the valid data signal is taken after, rather than before, the master latch. Glitches, that might occur during the first half of the clock cycle are ignored. During the second half of the clock cycle, clock polarity serves to filter out glitches on the valid data signal. So, in a late valid ISP embodiment, the valid data signal must stabilize before the end of each clock cycle, i.e., before the clock edge starting the next clock period arrives.

The stall signal has the same timing constraints for both split latch and non-split latch ISP embodiments. Glitches are avoided on the stall signal during the first half of the clock cycle because the stall latch is opaque. During the second half of the clock cycle, glitches on the stall signal are filtered out at the clock gating logic by the clock polarity. The stall signal must stabilize before the end of each current clock cycle, i.e., before the clock edge starting the next clock period arrives. Delay gates may be inserted on non-gated local clocks to zero out clock skew that might have been introduced by the gating functions on gated clocks.

Pulsed Latch ISP

Figure 9A:
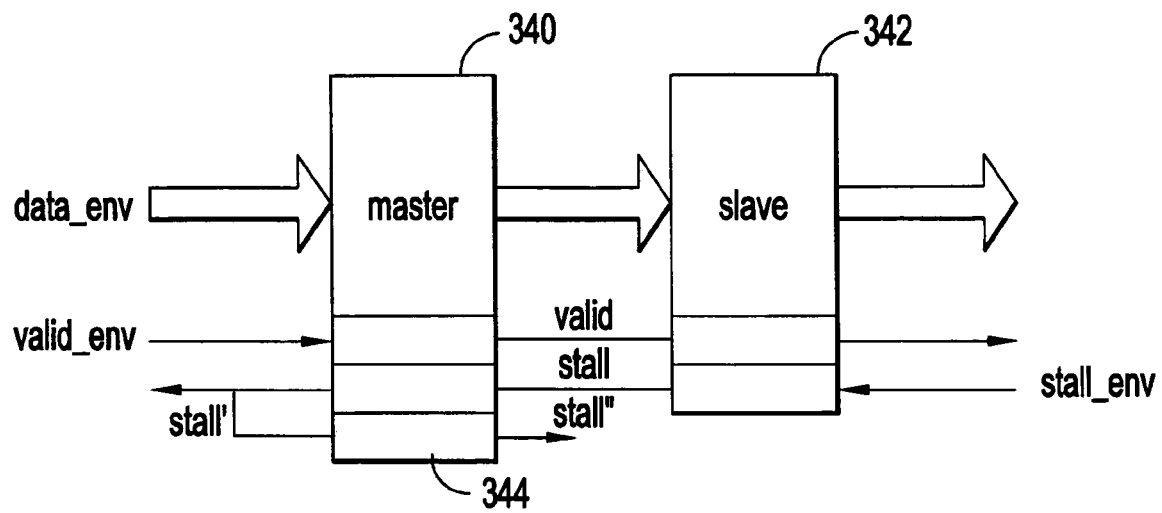
FIGS. 9A-9B show an example of a pulsed transparent master/slave pair for a second pulsed mode ISP embodiment with further reduced clock power.
Figure 9B:
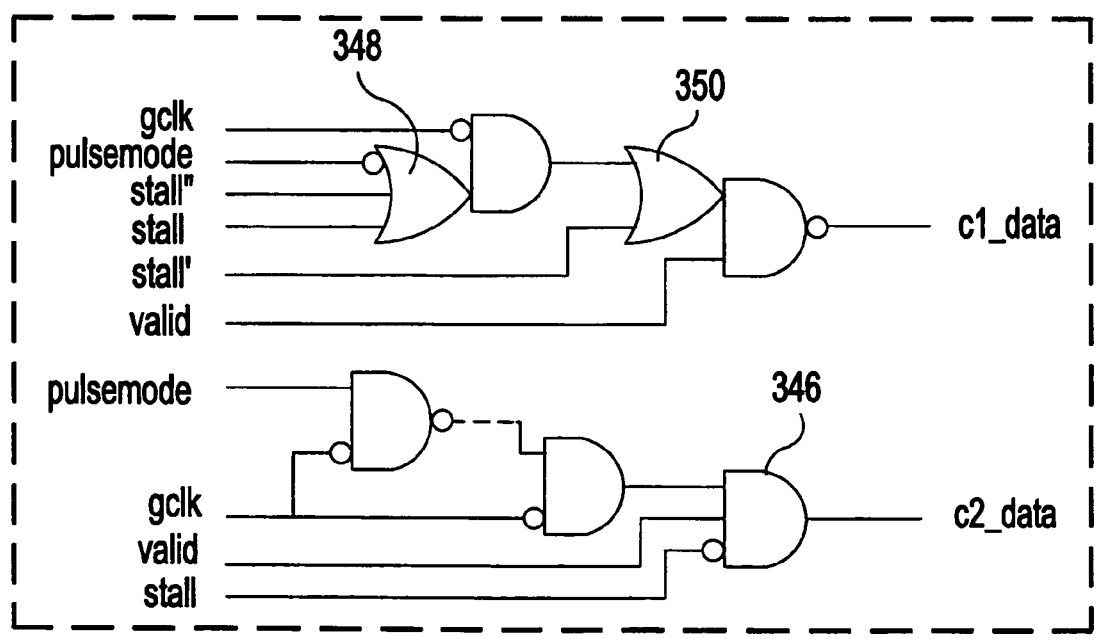

FIGS. 9A-B shows an example of a pulsed master/slave pair 340, 342 and clock logic gating functions therefor, which may be used in a pulsed mode ISP embodiment for further reduced clock power over a two phase master/slave ISP embodiment. The master/slave pair 340, 342 has two operation modes, a normal two phase clocked master/slave operation mode and a pulsed operation mode. Normally, in pulsed mode, the master 340 remains transparent (master clock is continually hot) and the clock is pulsed to the slave 342. Since the master and slave 340, 342 form a basic two stage latch structure, they can still store two data items, one in each stage. The valid data and stall latches run in normal two phase clocked master/slave mode operation. The same clock gating logic 314, 316, 318, 320, 322, 324 shown in the example of FIG. 8 may be used to control the clock to the valid data and stall latches. An extra stall" latch is included to avoid turning on the data latch clock (cl_data) early when the stall condition ends, which could happen while the slave data stage is still being pulsed. The stall" latch 344 is clocked by an ungated global clock (gclk) with necessary skew delay adjustment.

Thus, when a stall condition is asserted, the clock logic for the master latch reverts back from hot mode to two phase clocked mode. The stall input to AND gate 346 disables the clock pulse to the slave 342, pausing it and holding the old data value; and, the clock to the master 340 is first enabled by the stall signal input to OR gate 348 and then, disabled by stall' at OR gate 350 to make master 340 opaque also, storing the upstream data item. Thus, two data items are paused, one in the master 340 and one in the slave 342. When the stall condition is deasserted, the clock to the slave 342 is enabled again and propagates the second data item to the environment. On the next clock edge, the master is made transparent, and the pair again runs in pulsed mode with the clock logic configured for pulsed operation.

Due to the asymmetric nature of pulsed master-slave pipelines, when at the end of a clock cycle the slave latch holds data that must be stalled and new data arriving to the master latch must also be stalled, then master and slave stalls simultaneously. The slave latch stalls an already stored data and the master latch both stores and stalls arriving data simultaneously. Note that a pulsed master-slave stage as described above can also operate as a pair of split latch stages.

ISP Primitives

The above preferred embodiments have been described with reference to a simple linear pipeline structure. However, a typical pipeline register, circuit, chip, system, etc. may have a much more complex path that can be viewed as a collection of data flow primitives that steer data to desired locations of the system. These primitives include pipeline forks, joins, branches, and select structures that can be used to build complex pipeline systems. The present invention has application to pipelines including such primitives, especially in synchronous interlocked pipeline structures.

Figure 10:
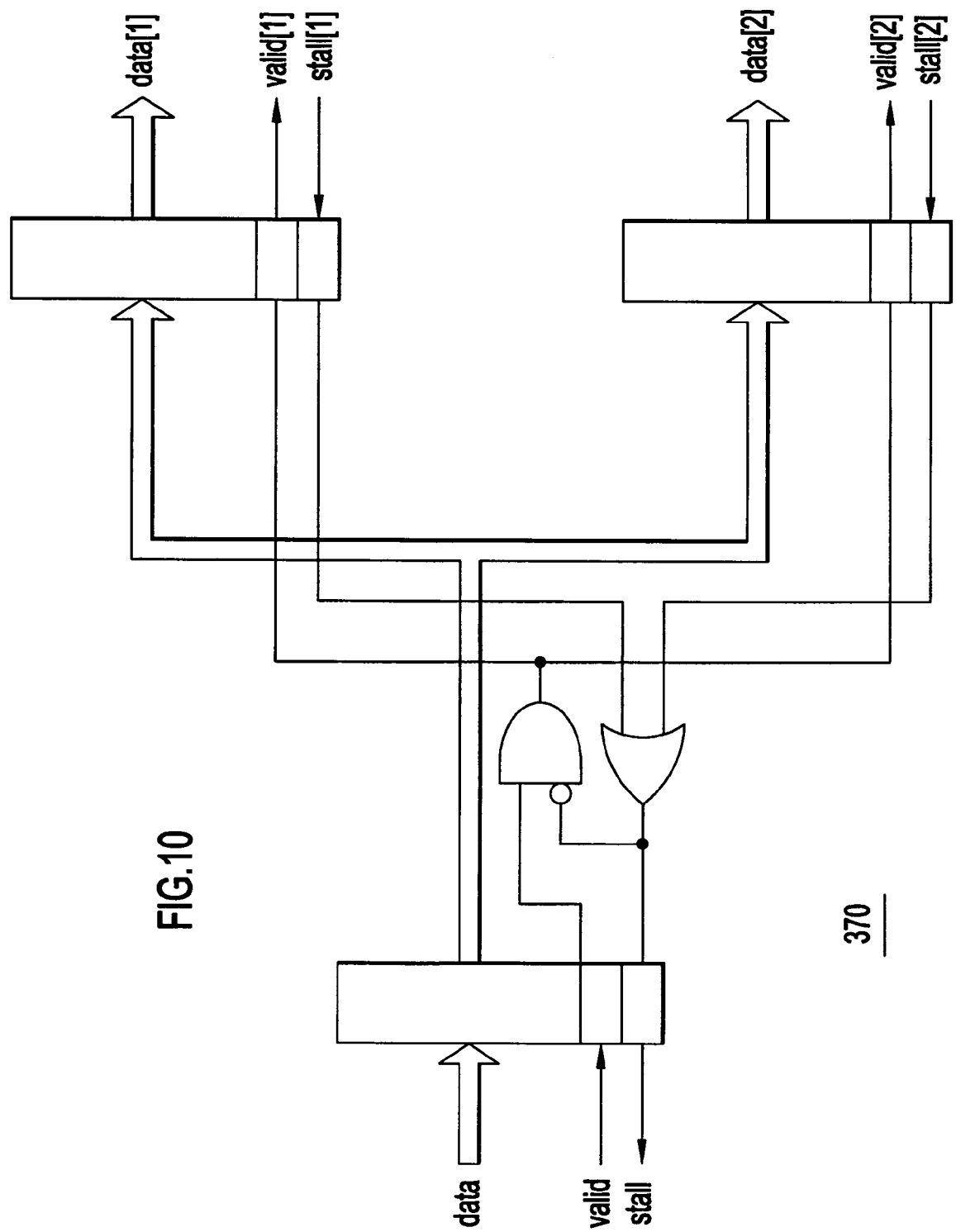
FIG. 10 shows an application of the ISP embodiment of the present invention to a 1 to 2 fork stage.

FIG. 10 shows an example of an application of the ISP embodiment of the present invention to a 1 to 2 fork stage 370. Generally, a pipeline fork stage is a 1 to N path split, where a data item from an upstream stage flows into all N parallel downstream pipeline stages. A fork stage must stall if any downstream stage in any of its N paths stalls. When a fork stage is stalled, non-stalled downstream stages must be prevented from receiving duplicate copies of the data as valid from the stalled fork stage. Thus, the simplest way this can be accomplished is through a synchronized, or aligned, fork stage where the valid data signals to all downstream stages are zeroed out (indicating invalid data is being provided) until all downstream stall conditions have ended. Thus, once the stall abates, all downstream stages simultaneously receive the newly unstalled data. The valid data and stall signal logic for a 1 to N synchronized fork stage must satisfy:

stall=(stall[1] OR . . . OR stall[$N$])

valid[$i$]=valid AND ¬(stall[1] OR . . . OR stall[$N$])

Alternatively, the fork stage can be implemented as a non-synchronized, or nonaligned, fork with the valid and stall logic implemented as a state machine to keep track of whether data has already been copied to a downstream stage or not. In this alternate embodiment, data is copied to downstream stages on an individual basis as they become non-stalled, giving the computation in non-stalled downstream pipelines an early start.

Figure 11:
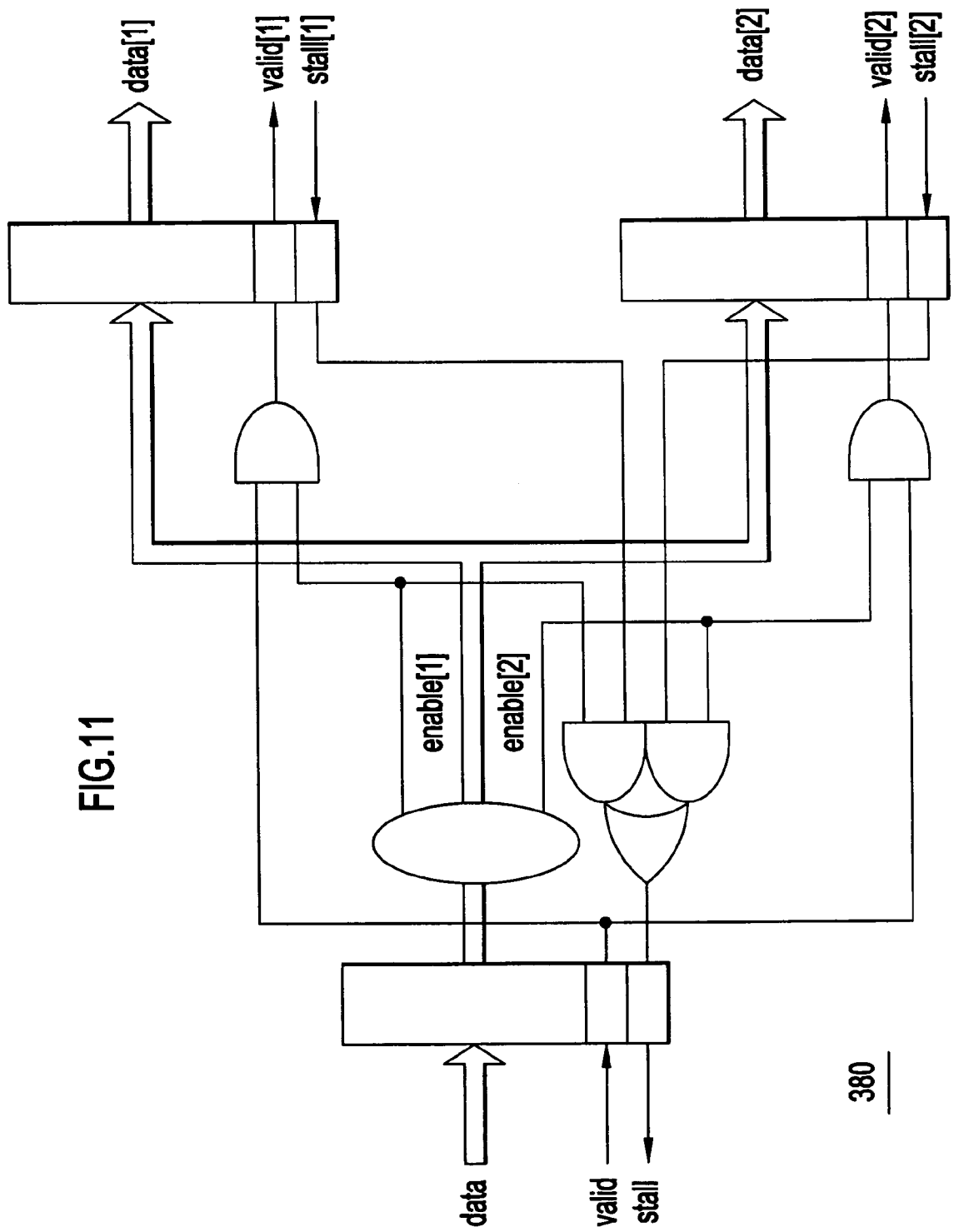
FIG. 11 shows an application of the ISP embodiment of the present invention to a 1 to 1-of-2 branch stage.

FIG. 11 shows an example of an application of the ISP embodiment of the present invention to a 1 to 1-of-2 branch stage 380. Generally, a pipeline branch stage is a 1 to 1-of-N selector that propagates data from an upstream stage to one of N parallel downstream stages. Selection of the downstream stage is determined by the data path logic that generates a set of N one-hot encoded enabling signals. The enable signals mask the branch stage valid data signal through a set of AND functions such that the valid data signal propagates only to the selected downstream stage. The branch stage stalls only if the selected downstream stage is already stalled. The valid data and stall signal logic for a 1 to 1-of-N branch stage must satisfy:

stall=enable[1] AND stall[1] OR . . . OR enable[$N$] AND stall[$N$])

valid[$i$]=valid AND enable [$i$]

Figure 12:
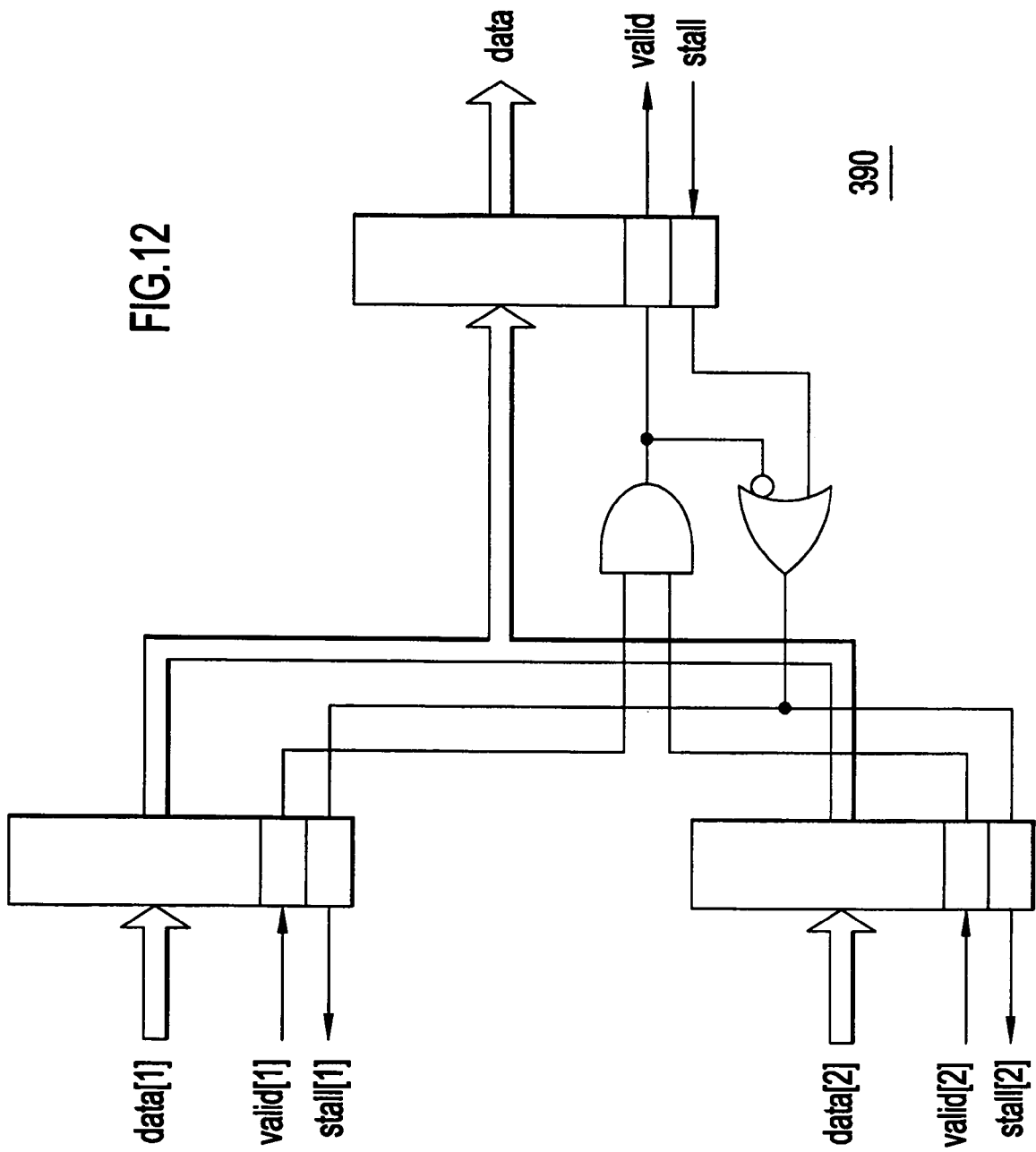
FIG. 12 shows an application of the ISP embodiment of the present invention to a 2 to 1 join stage.

FIG. 12 shows an example of an application of the ISP embodiment of the present invention to a 2 to 1 join stage 390. Generally, a pipeline join stage is an N to 1 merger that concatenates data from N upstream stages to one downstream stage. The join stage must wait until data is valid in all upstream stages before concatenating and propagating the data to the downstream stage. A join stage synchronizes and aligns data streams from multiple pipelines. Since data in different upstream stages can become valid at different times, any stage that contains valid data must be stalled until all stages have valid data that can pass to the downstream stage. If the join stage stalls, e.g., because valid data has not yet reached the join stage, all upstream stages must stall. The valid data and stall signal logic for an N to 1 join stage must satisfy:

valid=valid[1] AND . . . AND valid[$N$]

stall[$i$]=¬valid OR stall

Figure 13:
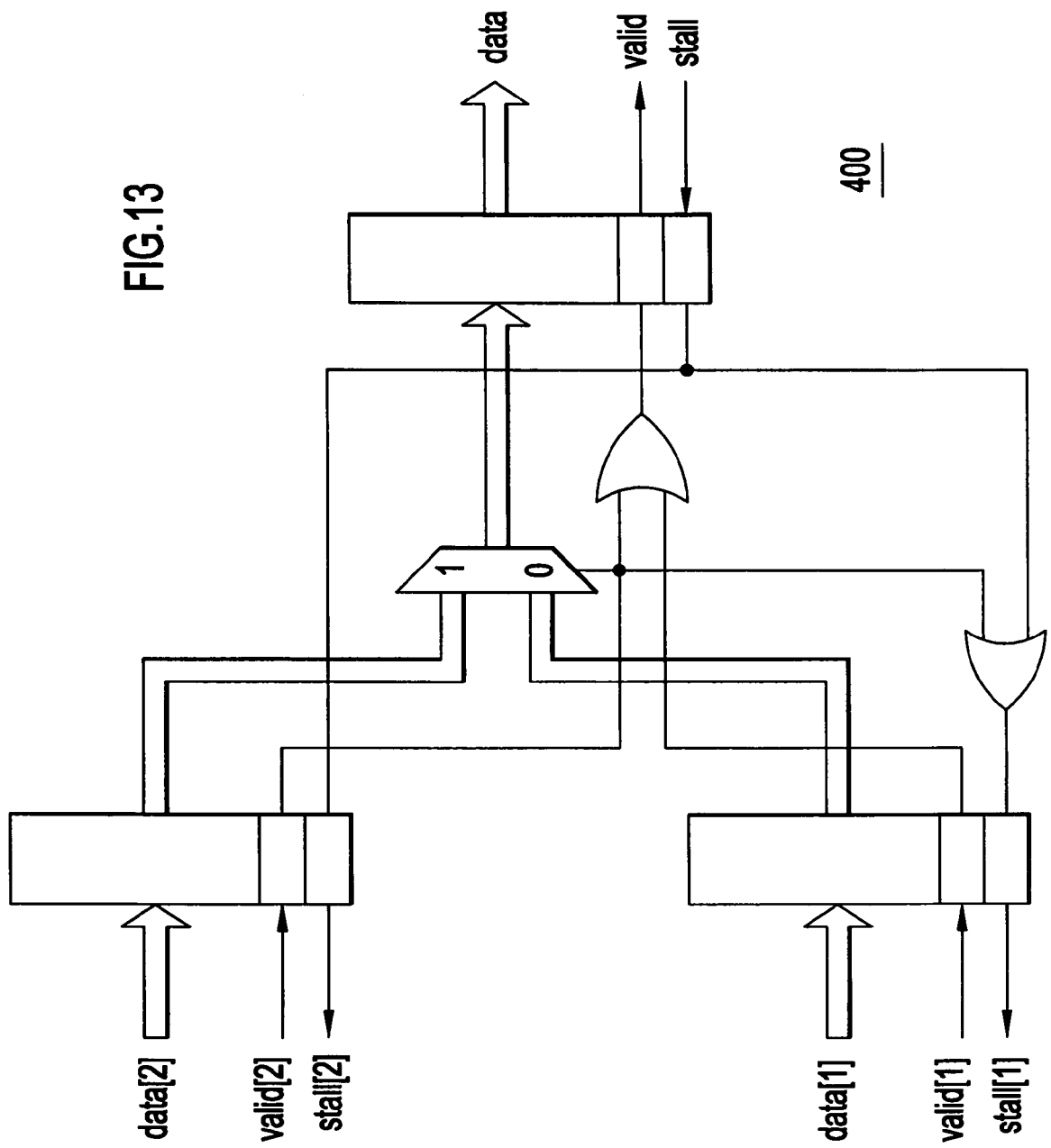
FIG. 13 shows an application of the ISP embodiment of the present invention to a 1-of-2 to 1 select stage, where stage 2 has priority over stage 1.

FIG. 13 shows an example of an application of the ISP embodiment of the present invention to a 1-of-2 to 1 select stage 400 where stage 2 has priority over stage 1. Generally, a pipeline select stage is a 1-of-N to 1 selector that propagates data from one of N upstream stages to one downstream stage, essentially providing a basic if-then-else multiplexor function. A select stage waits until data is valid in at least one of the upstream stages. One stage is then chosen through priority based selection and valid data from the selected stage propagates to the downstream stage. Every other upstream stage that contains valid data must stall until it is selected. The data, valid data and stall signal logic for a 1-of-N to 1 select stage, where a higher index i indicates a higher priority, must satisfy:

valid=valid[1] OR . . . OR valid[$N$]

stall=stall OR (($i$<$N$) AND (valid[$i$+1] OR . . . OR valid[$N$])))

data=if (valid[$N$]) data[$N$] elsif . . . elsif (valid[1]) data[1]

A select stage also acts as a priority arbiter deciding which upstream stage wins the arbitration and which competing stages, if any, must stall. State based selection, rather than priority selection, can be implemented through state machines.

Figure 14:
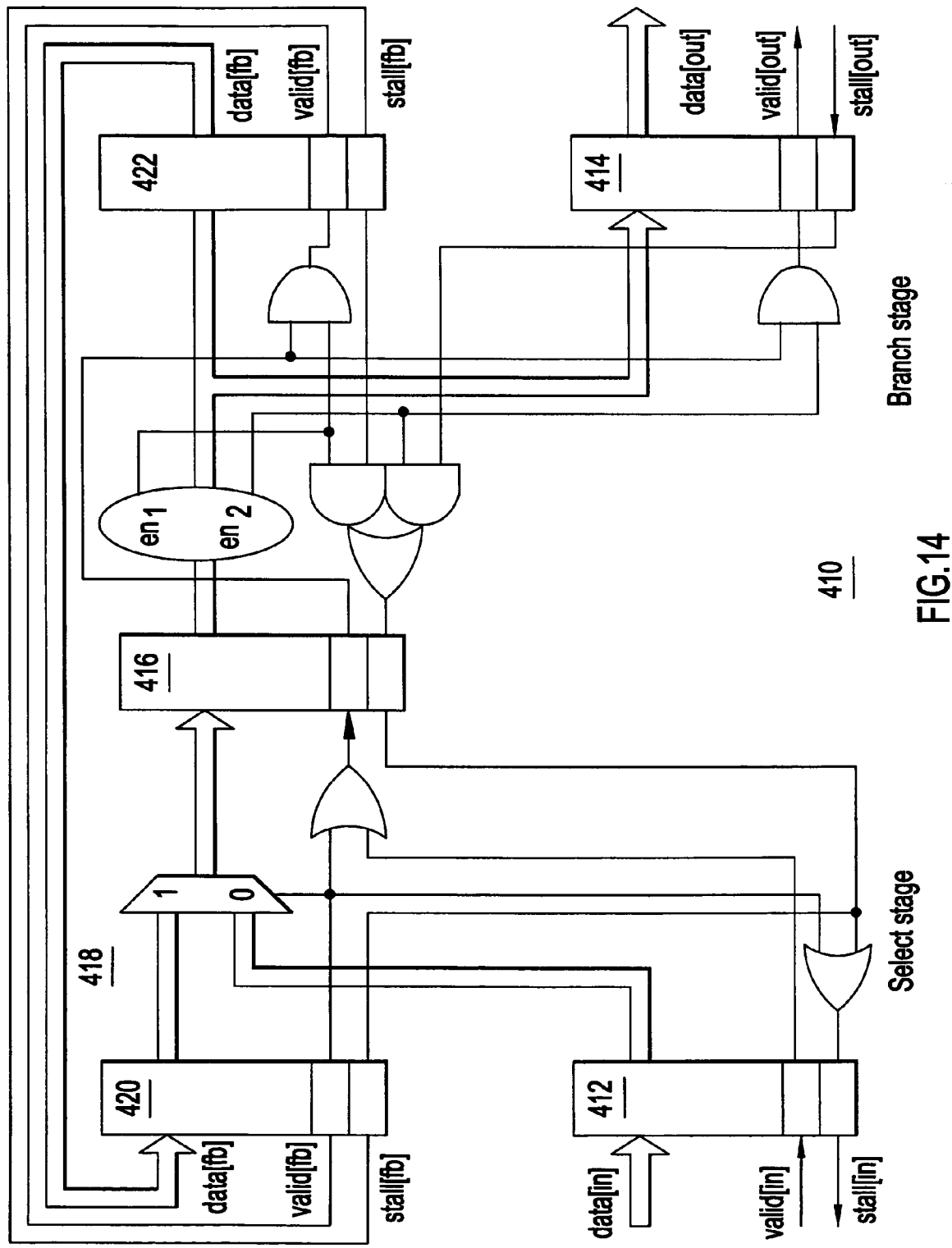
FIG. 14 shows an application of the ISP embodiment of the present invention to a multicycle pipeline.

FIG. 14 shows an example of an application of the ISP embodiment of the present invention to multicycle pipeline 410, in this example an N-cycle circular pipeline structure (a ring) with an input stage 412 and an output stage 414 for reading in data from, and writing out data to, an environment. The input stage 412 of the ring 416 is implemented as a select stage 418 and the output stage 414 is implemented as a branch stage. This pipeline example allows multiple multicycle computations to be interleaved in the ring 416 for maximal throughput. Every cycle the feedback stage 420 input to the select stage 418 is checked for valid data. If the feedback stage 420 input is not valid, new data is read into the ring 416 from the input stage 412, if available. In the branch stage 422, the data path logic determines if the current data needs to continue iterating through stage 420 to the ring 416, or if it should be written to the output stage 414 and generates an enabling signal (not shown), accordingly.

Accordingly, the present invention has application to custom pipeline structures and behaviors by providing suitable logic for generating appropriate valid data and stall signals. In particular, logic functions for the valid data and stall signals can be described in any well known specification language such as VHDL or Verilog, and then synthesized to a gate netlist using standard synchronous synthesis tools.

ISP Storage Properties

Advantageously, preferred embodiment pipelines can store more data than what was heretofore possible in synchronous pipelines and queues. A typical N-stage prior art synchronous first-in, first-out (FIFO) register can store up to N/2 data items. When the FIFO contains no more than N/2 data items (i.e., it has an occupancy less than or equal to N/2), the latency of a preferred embodiment ISP FIFO and a normal synchronous pipeline is substantially the same. However, while the N/2+$1^{st}$ data item would stall the prior art FIFO, a preferred embodiment ISP FIFO continues accepting inputs past N/2 valid data items, storing up to N data items before being unable to accept input data items. Thus, with between N/2 and N items occupancy, the latency through the ISP FIFO is directly proportional to the occupancy because ISP storage capacity and latency varies dynamically with the input/output rate of data items.

Figure 1B:
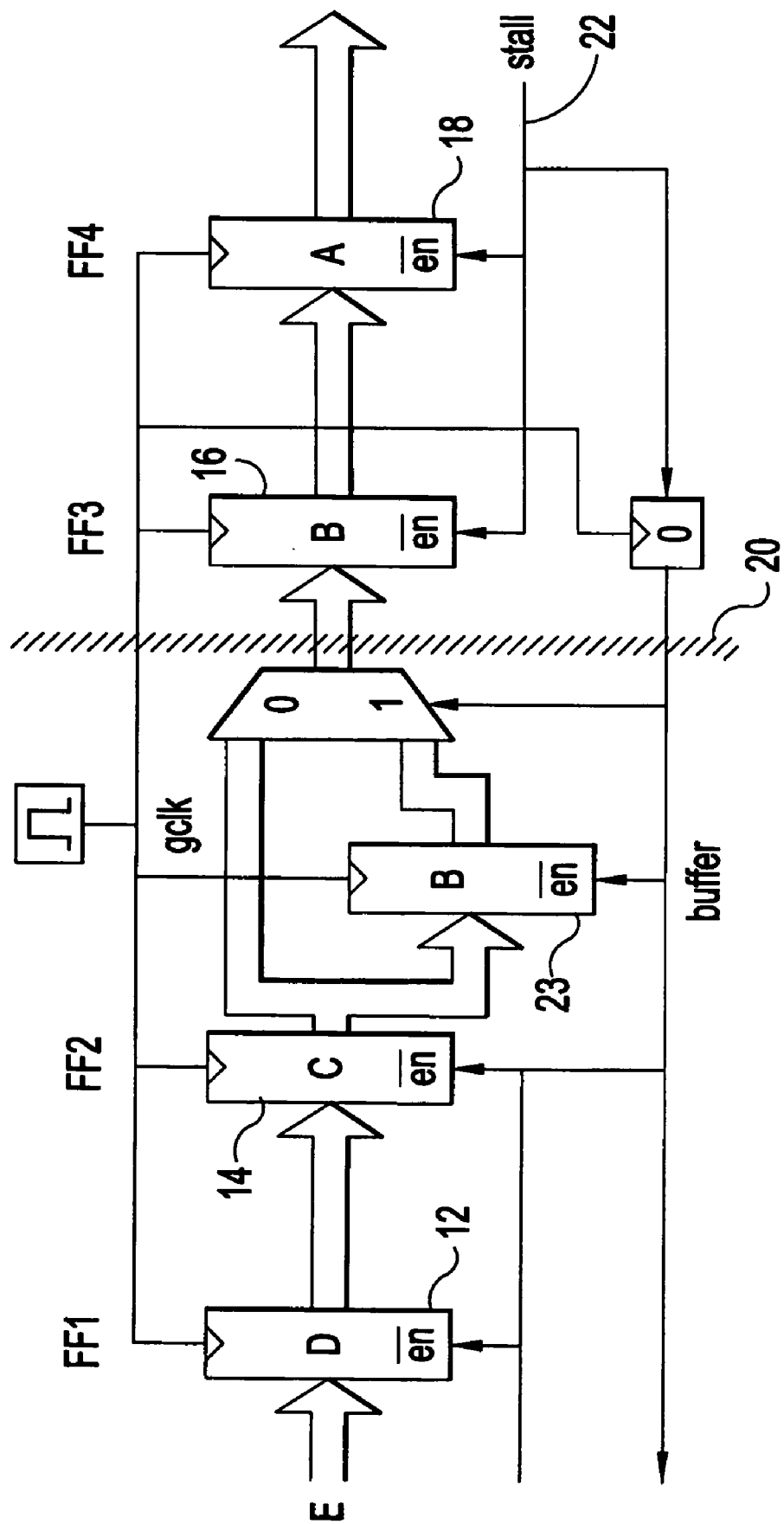
FIG. 1B shows a traditional approach to handling progressive stalls wherein buffer stages (staging latches) are inserted in parallel to the pipeline at stall boundaries.

Therefore, because the ISP of the present invention has double the effective storage capacity of prior art pipelines, ISP queues may be considerably smaller than normal state of the art queues and still provide more storage capacity. Thus, ISP queues save significant area and power at the same average performance. The elastic storage properties can also be used advantageously in more general pipeline structures where the extra storage capacity may reduce or eliminate the need for extra pipeline buffer stages, e.g., FIG. 1B. In particular, the elastic storage can provide the staging latches needed to stall high frequency pipelines, saving power, area, and delay.

A first-in, first-out register is a pipelined structure in which data items are queued. Data is taken out of the first-in, first-out register in the order it was inserted. A queue structure is a generalized version of the first-in, first-out register where data is not necessarily taken out in the same order it was inserted. In the most general concept of a queue, data can be inserted in any place in the queue at any time and taken out from any place in the queue at any time. Examples of queue structures are last-in, first-out registers, and issue queue registers. The ability of ISP pipelines to double the effective storage capacity is also applicable to such general queue structures.

CONCLUSIONS

Advantageously, the ISP embodiment significantly reduces clock power consumption in high frequency, high performance microprocessors, even further than the ESP embodiment. The ISP embodiment provides a structured and well defined approach to fine-grained clock gating at the pipeline stage (or individual latch-macro) level using the preferred valid/stall handshake protocol to determine when and whether the stage should be clocked. Stages are clocked only when the input contains valid data and the output is not experiencing a stall (data hold). The ISP embodiment provides a designer friendly approach for specifying and implementing clock gating to achieve the finest granularity of clock gating yet realized, i.e., at the pipeline stage (latch-macro) level and is compatible with synchronous design methodologies that support clock gating.

Thus, the ISP embodiment extends the locally stalled pipelines of the ESP embodiment to provide optimal local clock gating for synchronous pipelines, providing a practical and cost effective clock gating technique based on both valid data and stall conditions. The present invention has application to generalized pipeline structures and may be implemented with two phase, pulsed, pre-charge and other appropriate latches. In modern microprocessors clock power is estimated to be reduced to up to 5 times lower than clock power in prior art non-gated designs. The amount of power savings of course varies depending on the microarchitetcure used and what program is running.

Furthermore, by temporarily storing data in both master and slave stages during stalls, the present invention overcomes the classic overwritten data problem normally encountered when progressive stalling synchronous pipelines conditions. This is key for using stallable pipelines at very high clock frequencies.

In summary, the present invention and especially the ISP preferred embodiment provides a significant design effort reduction; the ISP embodiment provides a natural, clearly defined and structured approach to clock gating based on well known handshake concepts. Handshake based interlocking enables direct integration of asynchronous pipeline segments in synchronous pipelines with minimal control logic redesign. Clock power is minimized, especially with gating the clock at the stage (latch-macro) level based on both invalid data and stall (data hold) conditions. The present invention is very flexible; clock gating based on valid/stall handshaking protocols can be applied in any combination (only valid, only stall, both valid and stall) and at any level of granularity (unit, pipeline stage, latch-macro, and anything between), so that the designer has maximum flexibility in deciding what extent to gate the clock. Because gating decisions are made local to each latch macro, slack may be reduced on valid/stall signals, enabling progressive stalling of high frequency pipelines without having to introduce staging latches and saving additional power by allowing earlier clock gating. The present invention increases effective storage capacity; the elastic storage properties of preferred embodiment pipelines allows such a pipeline to hold up to twice as many data items (one data item in each of the master and slave) as a typical prior art pipeline. In particular, this increases storage capacity in queue structures. Also, data path area, power, and delay are improved by eliminating the need for data hold muxes. Finally, preferred embodiment pipelines are fully testable using stage of the art testing techniques. Although data is stored in both master and slave stages, it is fully testable using for example, level sensitive scan design (LSSD) techniques without additional scan latches or logic structures.

While the invention has been described in terms of several (example) preferred embodiments, those skilled in the art will recognize that the invention can be practiced with modification within the spirit and scope of the appended claims.

We claim:

1. A method of stalling one or more stages in a pipeline of an integrated circuit comprising the steps of:
    creating a stall signal for stalling a stage in the pipeline; and
    creating one or more delayed stall signals, causally related to said stall signal, the delayed stall signals stalling one or more adjacent upstream stages a delay time later than said stage is stalled, wherein the stages of said pipeline operate in lock step and unstalled valid data may be stored only in every other stage at any given time, upstream stages progressively filling with valid data in each stage during a stall condition, filled said upstream stages buffering stored valid data during said stall condition.

2. A method, as in claim 1, where a stage is stalled only if it contains valid data.

3. A method, as in claim 1, wherein only adjacent upstream stages containing valid data are stalled.

4. A method, as in claim 1, wherein said pipeline is one of the following:
    a) a synchronous pipeline;
    b) a locally clocked pipeline;
    c) an interlocked pipeline; and
    d) an asynchronous pipeline.

5. A method, as in claim 1, wherein a stage contains a plurality of storage nodes, said plurality of storage nodes each capable of storing an input, said plurality of storage nodes allowing an indication to an upstream stage that a current stage is stalled to be delayed until said plurality of storage nodes in said current stage each store data.

6. A method, as in claim 5, wherein said plurality of nodes form a parallel structure, each said node in said parallel structure accessed responsive to a one (1) of N to 1 multiplexor.

7. A method, as in claim 5, wherein data propagates through said plurality of nodes in a sequential manner.

8. A method, as in claim 1, where data arrives to a current stage from an upstream adjacent stage of said pipeline, said data being indicated as valid or not valid, comprising the steps of:
    1. A) if arriving data to said current stage is indicated as valid then performing the following steps:
        a) storing said arriving data in an output node of said current stage,
        b) indicating that said output node of said current stage is valid,
        c) proceeding to step 2A;
    B) if said arriving data to said current stage is indicated as not valid then returning to step 1A;

2. A) if arriving data to said current stage is indicated as valid then performing the following steps:
   a) if a downstream adjacent stage is indicated as stalled then performing the following steps:
      i) storing said arriving data in an internal node of said current stage,
      ii) stalling said current stage,
      iii) indicating that said current stage is stalled, and
      iv) proceeding to step 3A;
   b) if said downstream adjacent stage is indicated as not stalled then performing the following steps:
      i) storing said arriving data in said output node of said current stage,
      ii) returning to step 2A;
   B) if said arriving data to said current stage is indicated as not valid then performing the following steps:
      a) if said downstream adjacent stage is indicated as stalled then returning to step 2A;
      b) if said downstream adjacent stage is indicated as not stalled then performing the following steps:
         i) indicating that said output node of said current stage is not valid,
         ii) returning to step 1A;
      C) returning to step 2A;
3. A) if said downstream adjacent stage is indicated as not stalled then performing the following steps:
   a) storing data currently in said internal node in said output node of said current stage,
   b) unstalling said current stage,
   c) indicating that said current stage is not stalled,
   d) returning to step 2A;
   B) if said downstream adjacent stage is indicated as stalled then returning to step 3A.

9. A method, as in claim 8, where the steps (a), (c), and (g) are each initiated by a stage triggering event.

10. A method, as in claim 9, where each of the stage triggering events are delayed in time from one another.

11. A method, as in claim 9, where each said stage triggering event is caused by a synchronous clock.

12. A method, as in claim 8, wherein a current stage is interlocked to its adjacent upstream stage and adjacent downstream stage by using said valid indication and said stall indication to implement an interlocking valid-stall handshake protocol.

13. A method, as in claim 1, where data arrives to a current stage from an upstream adjacent stage of said pipeline, comprising the steps of:
   1. A) storing arriving data in an output node of said current stage;
   2. A) if a downstream adjacent stage is indicated as stalled then performing the following steps:
      a) stalling said current stage,
      b) indicating that said current stage is stalled,
      c) returning to step 2A;
   B) if said downstream adjacent stage is indicated as not stalled then performing the following steps:
      a) unstalling said current stage,
      b) indicating that said current stage is not stalled,
      c) returning to step 1A.

14. A method, as in claim 1, where data arrives to a current stage from an upstream adjacent stage of said pipeline, said data being indicated as valid or not valid, comprising the steps of:
   1. A) if arriving data to said current stage is indicated as valid then performing the following steps:
      a) storing said arriving data in an output node of said current stage;
      b) indicating that said output node of said current stage is valid;
      c) proceeding to step 2A;
   B) if arriving data to a current stage is indicated as not valid then performing the following steps:
      a) indicating that said output node of said current stage is not valid,
      b) returning to step 1A;
   2. A) if a downstream adjacent stage is indicated as stalled then performing the following steps:
      a) stalling said current stage,
      b) indicating that said current stage is stalled,
      c) returning to step 2A;
   B) if said downstream adjacent stage is indicated as not stalled then performing the following steps:
      a) unstalling said current stage,
      b) indicating that said current stage is not stalled,
      c) returning to step 1A.

15. A method, as in claim 14, where the steps (a) and (f) for said current stage are initiated by alternate stage triggering events.

16. A method, as in claim 15, where each of the stage triggering events are delayed in time from one another.

17. A method, as in claim 15, wherein said alternate stage triggering events are caused by a synchronous clock.

18. A pipeline in an integrated circuit comprising:
   means for creating a stall signal for stalling a stage in the pipeline; and
   means for creating one or more delayed stall signals, causally related to said stall signal, the delayed stall signals stalling one or more adjacent upstream stages a delay time later than said stage is stalled, wherein the stages of said pipeline operate in lock step and unstalled valid data may be stored only in every other stage at any given time, upstream stages progressively filling with valid data in each stage during a stall condition, filled said upstream stages buffering stored valid data during said stall condition.

* * * * *